(12) United States Patent
Elliott et al.

(10) Patent No.: US 10,872,122 B2
(45) Date of Patent: Dec. 22, 2020

(54) KNOWLEDGE MANAGEMENT SYSTEM AND PROCESS FOR MANAGING KNOWLEDGE

(71) Applicant: Government of the United States of America, as represented by the Secretary of Commerce, Gaithersburg, MD (US)

(72) Inventors: John Elliott, Silver Spring, MD (US); Talapady N. Bhat, Gaithersburg, MD (US); Ursula R. Kattner, Germantown, MD (US); Carelyn E. Campbell, Germantown, MD (US); Ram D. Sriram, Ellicott City, MD (US); Eswaran Subrahmanian, Washington, DC (US); Jacob Collard, Ithaca, NY (US); Ira Monarch, Pittsburgh, PA (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 234 days.

(21) Appl. No.: 15/883,449

(22) Filed: Jan. 30, 2018

(65) Prior Publication Data
US 2019/0236153 A1    Aug. 1, 2019

(51) Int. Cl.
*G06F 16/93* (2019.01)
*G06F 16/21* (2019.01)
(Continued)

(52) U.S. Cl.
CPC ............ *G06F 16/93* (2019.01); *G06F 16/212* (2019.01); *G06F 16/313* (2019.01); *G06F 16/3344* (2019.01); *G06F 40/117* (2020.01); *G06F 40/169* (2020.01); *G06F 40/211* (2020.01); *G06N 5/00* (2013.01)

(58) Field of Classification Search
CPC . G06F 8/425; G06F 8/42; G06F 8/427; G06F 40/237; G06F 40/284; G06F 16/3335; G06F 40/211
See application file for complete search history.

(56) References Cited

U.S. PATENT DOCUMENTS

2007/0033221 A1* 2/2007 Copperman .......... G06F 16/367
2007/0250487 A1* 10/2007 Reuther ................ G06F 16/367
(Continued)

OTHER PUBLICATIONS

Pradhan et al., "Shallow Semantic Parsing using Support Vector Machines", HLT-NAACL 2004 (Year: 2004).*
(Continued)

*Primary Examiner* — David T. Brooks
(74) *Attorney, Agent, or Firm* — Office of Chief Counsel for National Institute of Standards and Technology

(57) ABSTRACT

A knowledge management system includes: a default knowledge system including: a knowledge system and a knowledge database in communication with the knowledge system; and a knowledge store in communication with the default knowledge system and including: a taxonomy amendment, an annotation amendment, a canonicalization amendment, an ecosystem amendment, a term amendment, and a phrase amendment.

15 Claims, 37 Drawing Sheets

$A ::=$
$\text{Leaf}\{\text{TOKEN} : \textit{string}, \text{FEATURES} : \textit{string} \to \textit{string}\}$
$| \text{Node}\{\text{LEFT} : A, \text{RIGHT} : A, \text{HEAD} : \{\text{LEFT}, \text{RIGHT}\}\text{FEATURES} : \textit{string} \to \textit{string}\}$

(51) Int. Cl.
*G06N 5/00* (2006.01)
*G06F 40/117* (2020.01)
*G06F 16/33* (2019.01)
*G06F 40/211* (2020.01)
*G06F 40/169* (2020.01)
*G06F 16/31* (2019.01)

(56) References Cited

U.S. PATENT DOCUMENTS

| | | | |
|---|---|---|---|
| 2008/0221878 A1* | 9/2008 | Collobert | G06F 40/30 704/232 |
| 2010/0195909 A1* | 8/2010 | Wasson | G06F 40/169 382/176 |
| 2010/0235307 A1* | 9/2010 | Sweeney | G06F 16/3344 706/12 |
| 2013/0013291 A1* | 1/2013 | Bullock | G06F 40/30 704/9 |
| 2013/0204606 A1* | 8/2013 | Zong | G06F 40/45 704/8 |
| 2013/0325436 A1* | 12/2013 | Wang | G06F 40/30 704/9 |
| 2014/0074886 A1* | 3/2014 | Medelyan | G06F 16/36 707/777 |
| 2014/0095505 A1* | 4/2014 | Blanchflower | G06F 16/134 707/737 |
| 2014/0337355 A1* | 11/2014 | Heinze | G06F 16/313 707/742 |
| 2015/0142443 A1* | 5/2015 | Hwang | G06F 40/211 704/257 |
| 2016/0132484 A1* | 5/2016 | Nauze | G06F 40/242 704/9 |
| 2016/0188570 A1* | 6/2016 | Lobez Comeras | G06F 16/367 704/9 |
| 2017/0193393 A1* | 7/2017 | Contractor | G06N 5/022 |
| 2018/0232443 A1* | 8/2018 | Delgo | G06Q 30/06 |

OTHER PUBLICATIONS

Manning et al., "The Stanford CoreNLP Natural Language Processing Toolkit", Proceedings of 52nd Annual Meeting of the Association for Computational Linguistics: System Demonstrations, pp. 55-60, Baltimore, Maryland USA, Jun. 23-24, 2014. (Year: 2014).*

Bhat, T.N., et al., "Strategy for Extensible, Evolving Terminology for the Materials Genome Initiative Efforts", The Minerals, Metals & Materials Society, 2015, 1866-1875, vol. 67 No. 8.

* cited by examiner

Figure 6:
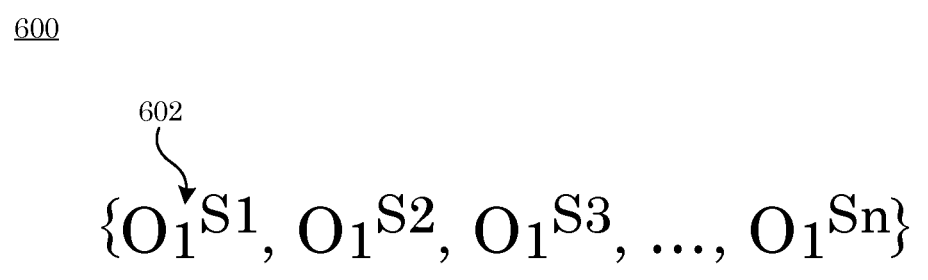

Figure 8:
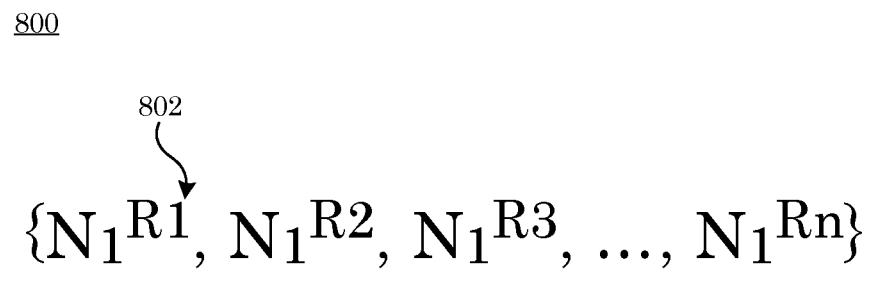

Figure 9:
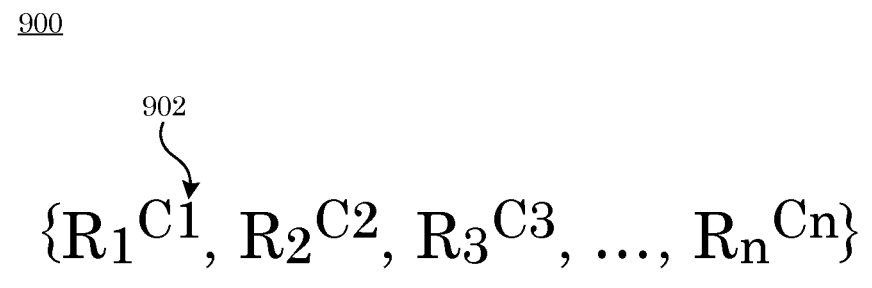

$\mathcal{A} :=$
  $Leaf$ {TOKEN : *string*, FEATURES : *string → string*}
  | $Node$ {LEFT : $\mathcal{A}$, RIGHT : $\mathcal{A}$, HEAD : {LEFT, RIGHT} FEATURES : *string → string*}

Figure 13

$$\begin{bmatrix} \text{CONTENT} : \textit{string} \\ \text{ANNOTATION} : \textit{A list} \end{bmatrix}$$

Figure 14

$$\begin{bmatrix} \text{TERM} : \textit{string} \\ \text{ANNOTATIONS} : \mathcal{A} \\ \text{DOCUMENT} : \mathcal{D}\ \textit{pointer} \end{bmatrix}$$

Figure 15

Algorithm 1 Root- and Rule-Based Terminology Generation

1: procedure MAIN(C)
2:     $P \leftarrow \varnothing$
3:     $T \leftarrow \varnothing$
4:     for all Documents $d$ in $C$ do
5:         ANNOTATE($d$)
6:         $P' \leftarrow$ EXTRACT($d$)
7:         $T' \leftarrow$ TERMS($P$)
8:         for all Term $t$ in $T$ do
9:             $t$.DOCUMENT $\leftarrow d$
10:        $P \leftarrow P \cup P'$
11:        $T \leftarrow T \cup T'$
12:     $R \leftarrow$ TAXONOMY($T$)
13:     return $(P, T, C, R)$

Figure 17

$$\begin{bmatrix} \text{CONTENT} = \text{An experimental study...} \\ \text{ANNOTATION} = \text{NULL} \end{bmatrix}$$

Figure 18

[An experimental study of a wing in a propeller slipstream]
[experimental study of a wing in a propeller slipstream]
[experimental study]
[a wing in a propeller slipstream]
[wing in a propeller slipstream]
[propeller slipstream]
[the spanwise distribution of the lift increase due to slipstream at different angles of attack of the wing and at different free stream to slipstream velocity ratios]
[spanwise distribution of the lift increase due to slipstream at different angles of attack of the wing and at different free stream to slipstream velocity ratios]
[spanwise distribution]
[lift increase]
[slipstream at different angles of attack of the wing and at different free stream to slipstream velocity ratios]
[slipstream]
[different angles of attack of the wing]
[angles of attack of the wing]
[angles of attack]
[attack]
[angle]
[wing]
[different free stream to slipstream velocity ratios]
[free stream]
[slipstream]
[velocity ratios]

Figure 21 propeller:0:slipstream:1:wing:2:experimental:0:study
experimental:0:study
propeller:0:slipstream:1:wing
propeller:0:slipstream
different:2:wing:1:attack:0:angle:4:different:3:free:0:stream:1:slipstream:2:velocity:0:ratio:5:slipstream:6:lift:0:increase:7:spanwise:0:distribution
spanwise:0:distribution
different:2:wing:1:attack:0:angle:4:different:3:free:0:stream:1:slipstream:2:velocity:0:ratio:5:slipstream:6:lift:0:increase
lift:0:increase
different:2:wing:1:attack:0:angle:4:different:3:free:0:stream:1:slipstream:2:velocity:0:ratio:5:slipstream
slipstream
different:2:wing:1:attack:0:angle
wing:1:attack:0:angle
attack:0:angle
attack
angle
wing
different:3:free:0:stream:1:slipstream:2:velocity:0:ratio
free:0:stream
velocity:0:ratio

Figure 22

Propeller:0:slipstream:1:wing:2:experimental:0:study (1)
Propeller:0:slipstream:1:wing (2)
experimental:0:study (2)
propeller:0:slipstream (2)

attack (8)
angle (8)
wing (7)
slipstream (6)
spanwise:0:distribution (2)
lift:0:increase (3)
attack:0:angle (7)
wing:1:attack:0:angle (6)
free:0:stream (5)
velocity:0:ratio (5)
different:2:wing:1:attack:0:angle (5)
different:3:free:0:stream:1:slipstream:2:velocity:0:ratio (4)
different:2:wing:1:attack:0:angle:4:different:3:free:0:stream:1:slipstream:2:velocity:0:ratio:5:slipstream (3)
different:2:wing:1:attack:0:angle:4:different:3:free:0:stream:1:slipstream:2:velocity:0:ratio:5:slipstream:6:lift:0:increase (2)
different:2:wing:1:attack:0:angle:4:different:3:free:0:stream:1:slipstream:2:velocity:0:ratio:5:slipstream:6:lift:0:increase:7:spanwise:0:distribution (1)

Figure 23

Algorithm 2 Document Annotation

Require: A domain-dependent preprocessing function $f : \mathcal{D} \to \mathcal{D}$
Require: A model $m : \mathcal{D} \to \mathcal{A}$ list
1: procedure ANNOTATE($d$)
2:     $d \leftarrow f(d)$
3:     $a \leftarrow m(d)$
4:     $d.\text{ANNOTATIONS} \leftarrow a$

Figure 25

Algorithm 3 Phrase Extraction

Require: A set of rules $E \subseteq \{e | e : \mathcal{A} \to \{0, 1\}\}$;
1: procedure EXTRACT($d$)
2:     $P' \leftarrow \{\}$
3:     for all $s$ in $d$.ANNOTATIONS do
4:         $N \leftarrow$ SUBTREES($s.a$)
5:         for all $n$ in $N$ do
6:             for all $e$ in $E$ do
7:                 if $e(n) = 1$ then
8:                     ADD($n, P'$)
9:     return $P'$

Figure 27

Algorithm 4 Subtree Identification

1: procedure SUBTREES($a$)
2:     if $a$ is a leaf node then
3:         return $<a>$
4:     else
5:         $l \leftarrow a.\text{LEFT}$
6:         $r \leftarrow a.\text{RIGHT}$
7:         if $l$ is a branching node or $r$ is a branching node then
8:             return $<a>$ + SUBTREES($l$) + SUBTREES($r$)
9:         else
10:            return $<a>$

Figure 28

Algorithm 5 Extraction Rule

1: procedure DEFAULTEXTRACTOR($n$)
2:     if $n$.FEATURES("pos") = N then
3:         return true
4:     else
5:         return false

Figure 29

Algorithm 6 Terminology Generation

1: procedure TERMS($P$)
2:     $T' \leftarrow \{\}$
3:     for all $p$ in $P$ do
4:         $t \leftarrow$ CONVERT($p$)
5:         if $t.\text{TERM} \neq$ "" then
6:             ADD($t, T$)
    return $T'$

Figure 31

Algorithm 7 Terminology Conversion

Require: A function $q$ : string $\to$ string
Require: A combination function $c : \mathcal{T} \times \mathcal{T} \times \mathcal{A} \to \mathcal{T}$
 1: procedure CONVERT($p$)
 2:     if $p$ is a leaf node then
 3:         return $q(p)$
 4:     if $p$.HEAD = LEFT then
 5:         current_head $\leftarrow p$.LEFT
 6:         current_dependent $\leftarrow p$.RIGHT
 7:     else
 8:         current_head $\leftarrow p$.RIGHT
 9:         current_dependent $\leftarrow p$.LEFT
10:     converted_head $\leftarrow$ CONVERT(current_head)
11:     converted_dependent $\leftarrow$ CONVERT(current_dependent)
12:     return $c$(converted_head, converted_dependent, $p$)

Figure 33

Algorithm 8 Taxonomy Generation

Require: A function $c : \mathcal{T} \to \mathcal{X}$
Require: A function $r : \mathcal{X} \times \mathcal{X} \to$ relation 1: procedure TAXONOMY($T$)
2:     $R \leftarrow \{\}$
3:     $X \leftarrow \{c(t) | t \in T\}$
4:     for all $a$ in $T$ do
5:         for all $b$ in $T$ where $a \neq b$ do
6:             if $r(a, b)$ succeeds then
7:                 Add $(a.\text{TERM}, b.\text{TERM}, r(a, b))$ to $R$
8:     Sort $R$ by term frequency.
9:     return $R$

$(PT_1, PT_2, PT_3, \ldots PT_n):(PT_l, PT_{l+1}, PT_{l+2}, \ldots PT_{l+m}):\ldots:(PT_n, PT_{n+1}, PT_{n+2}, \ldots PT_0)\}TA1$

KNOWLEDGE MANAGEMENT SYSTEM AND PROCESS FOR MANAGING KNOWLEDGE

STATEMENT REGARDING FEDERALLY SPONSORED RESEARCH

This invention was made with United States Government support from the National. Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 301-975-2573; email tpo@nist.gov; reference Ser. No. 15/883,449.

BRIEF DESCRIPTION

Disclosed is a knowledge management system comprising: a default knowledge system comprising: a knowledge system; and a knowledge database in communication with the knowledge system; and a knowledge store in communication with the default knowledge system and comprising: a taxonomy amendment; an annotation amendment; a canonicalization amendment; an ecosystem amendment; a term amendment; and a phrase amendment.

Also discloses is a process for managing knowledge, the process comprising: requesting a document by a knowledge manager; communicating the documents to the knowledge manager from a knowledge database; requesting a taxonomy by the knowledge manager; communicating the taxonomy to the knowledge manager from a taxonomy manager; requesting an ecosystem by the knowledge manager; communicating the ecosystem to the knowledge manager from an ecosystem manager; requesting a annotation by the knowledge manager; communicating the annotation to the knowledge manager from an annotation manager; and communicating a knowledge management data to a knowledge warehouse from the knowledge manager to manage knowledge.

Further disclosed is a computer-implemented method, comprising: requesting a document by a knowledge manager; communicating the documents to the knowledge manager from a knowledge database; requesting a taxonomy by the knowledge manager; communicating the taxonomy to the knowledge manager from a taxonomy manager; requesting an ecosystem by the knowledge manager; communicating the ecosystem to the knowledge manager from an ecosystem manager; requesting a annotation by the knowledge manager; communicating the annotation to the knowledge manager from an annotation manager; and communicating a knowledge management data to a knowledge warehouse from the knowledge manager to manage knowledge.

Also disclosed is a system comprising: one or more computers configured to perform operations, the operations comprising: requesting a document by a knowledge manager; communicating the documents to the knowledge manager from a knowledge database; requesting a taxonomy by the knowledge manager; communicating the taxonomy to the knowledge manager from a taxonomy manager; requesting an ecosystem by the knowledge manager; communicating the ecosystem to the knowledge manager from an ecosystem manager; requesting a annotation by the knowledge manager; communicating the annotation to the knowledge manager from an annotation manager; and communicating a knowledge management data to a knowledge warehouse from the knowledge manager to manage knowledge.

Also disclosed is a computer-readable medium having instructions stored thereon, which, when executed by a processor, cause the processor to perform operations comprising: requesting a document by a knowledge manager; communicating the documents to the knowledge manager from a knowledge database; requesting a taxonomy by the knowledge manager; communicating the taxonomy to the knowledge manager from a taxonomy manager; requesting an ecosystem by the knowledge manager; communicating the ecosystem to the knowledge manager from an ecosystem manager; requesting a annotation by the knowledge manager; communicating the annotation to the knowledge manager from an annotation manager; and communicating a knowledge management data to a knowledge warehouse from the knowledge manager to manage knowledge.

BRIEF DESCRIPTION OF THE DRAWINGS

The following descriptions should not be considered limiting in any way. With reference to the accompanying drawings, like elements are numbered alike.

FIG. 4 shows documents;
FIG. 5 shows objects of a document;
FIG. 6 shows sentences of an object;
FIG. 8 shows words of a snippet;
FIG. 9 shows canonicalized roots from a collection of words;
FIG. 10 shows phrases from roots;
FIG. 12 shows an ecosystem of a term of T1;
FIG. 13 shows a data type for a document annotation;
FIG. 14 shows a data type for a document object;
FIG. 15 shows a data type describing a term;
FIG. 17 shows pseudocode for production of terms, phrases, and relations;
FIG. 18 shows a document object element,
FIG. 21 shows phrases extracted from an annotated document;
FIG. 22 shows terms generated from a document;
FIG. 23 shows taxonomic relations;
FIG. 25 shows a pseudocode for document annotation;
FIG. 27 shows a pseudocode for phrase extraction;
FIG. 28 shows a pseudocode for subtree identification for phrase extraction;
FIG. 29 shows a pseudocode for default system for phrase extraction;
FIG. 31 shows a pseudocode for terminology generation;
FIG. 33 shows a pseudocode for phrase conversion.

FIG. 36 shows a pseudocode for taxonomy generation: and

FIG. 37 shows a taxonomy.

DETAILED DESCRIPTION

A detailed description of one or more embodiments is presented herein by way of exemplification and not limitation.

Advantageously and unexpectedly, it has been discovered that a knowledge management system that is a root- and rule-based knowledge system and a process for managing knowledge herein indexes documents with natural language processing tools and a rule and root based methodology. Unexpectedly and advantageously, the knowledge management system and process for managing knowledge create a phrase based structured keyword that encode semantics and facilitates a search of knowledge with the documents. Beneficially, the knowledge management system and process for managing knowledge search for terms and their context of appearance (also referred to as semantics) to disambiguate search results. The knowledge management system and process for managing knowledge continuously provides incremental evolution of terminology in a domain. A result from the knowledge management system and process for managing knowledge deterministically and consistently creates a domain based taxonomy of concepts and ecology of concepts and its evolution during a search and discovery process. The root- and rule-based knowledge system and process for managing knowledge can provide these useful results in a timely way that could not be done by humans alone even with other forms of computer support.

Figure 1:
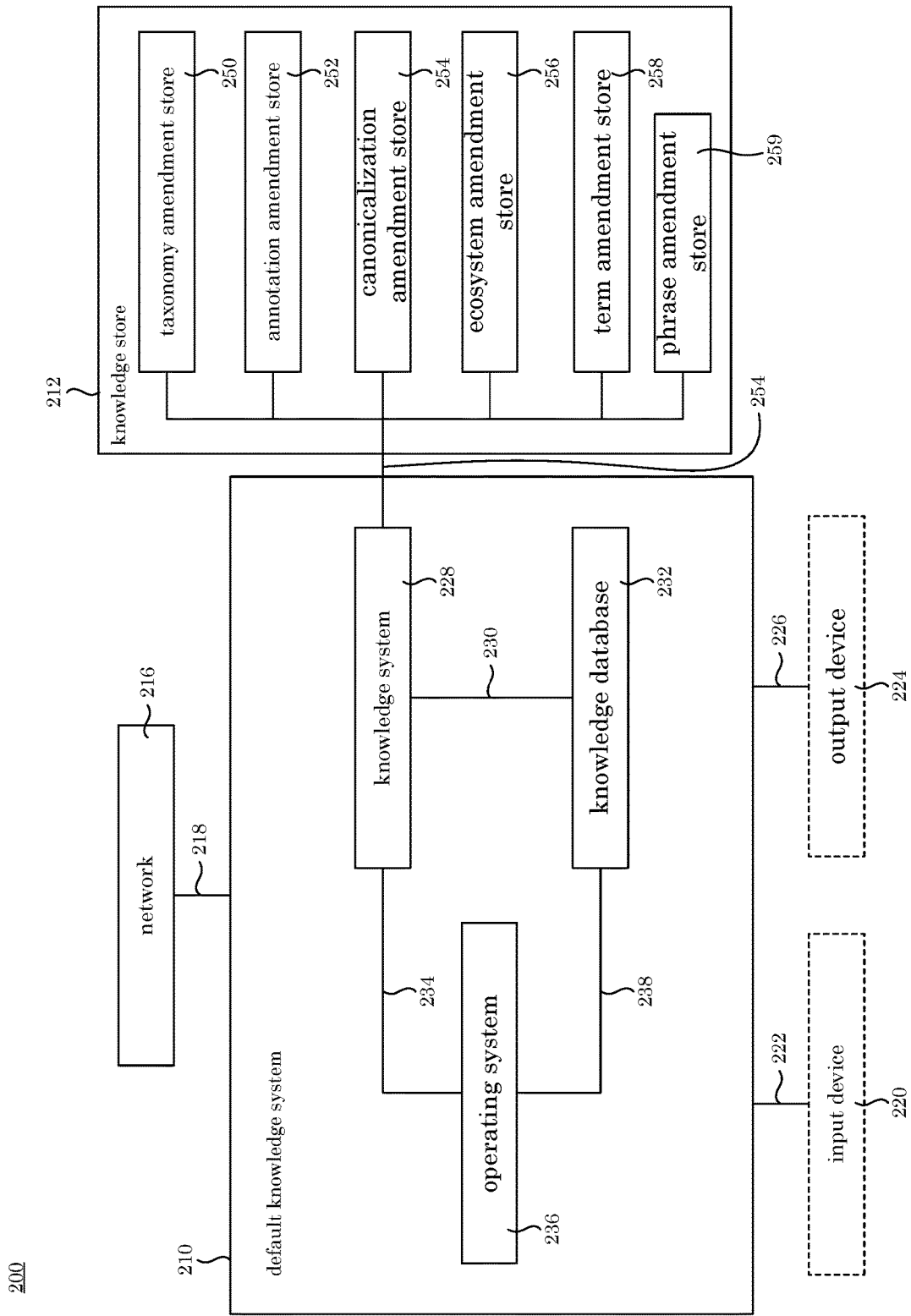
FIG. 1 shows a knowledge management system.

In an embodiment, with reference to FIG. 1, knowledge management system 200 manages knowledge and includes default knowledge system 210. Default knowledge system 210 includes knowledge system 228 and knowledge database 232 in communication with knowledge system knowledge system 228. Also, knowledge management system includes knowledge store 212 in communication with default knowledge system 210. Knowledge store 212 includes a taxonomy amendment store 250, an annotation amendment store 252, a canonicalization amendment store 254, an ecosystem amendment store 256, a term amendment store 258, and a phrase amendment store 259.

Knowledge management system further can include network 216 in communication with default knowledge system default knowledge system 210, input device 220 in communication with default knowledge system, output device 224 in communication with default knowledge system, or a combination thereof. It is contemplated that default knowledge system default knowledge system 210 can include operating system 236 in communication with knowledge system 228 and knowledge database knowledge database 232.

Figure 2:
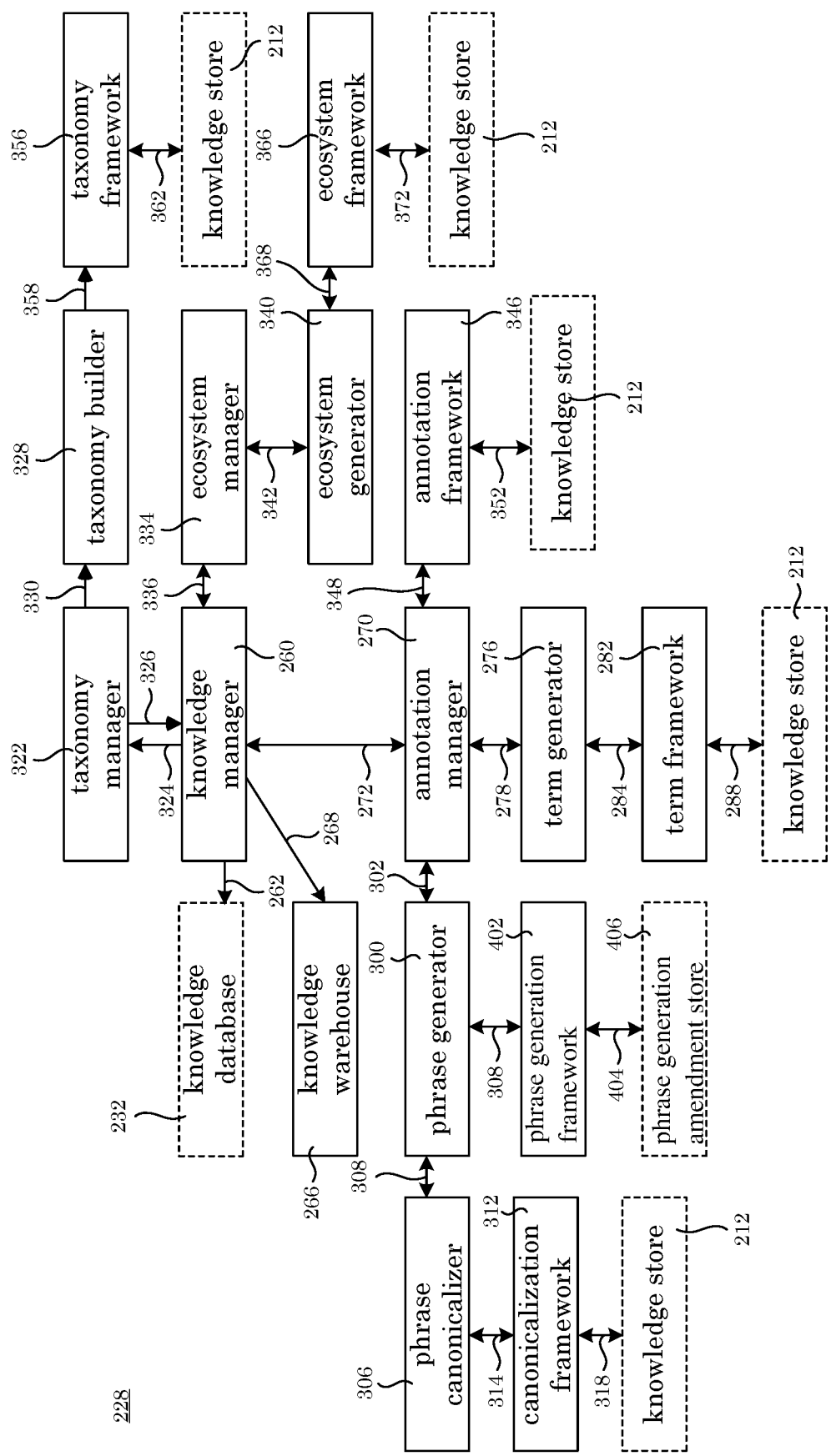
FIG. 2 shows communication of knowledge that involves a knowledge system.
Figure 3:
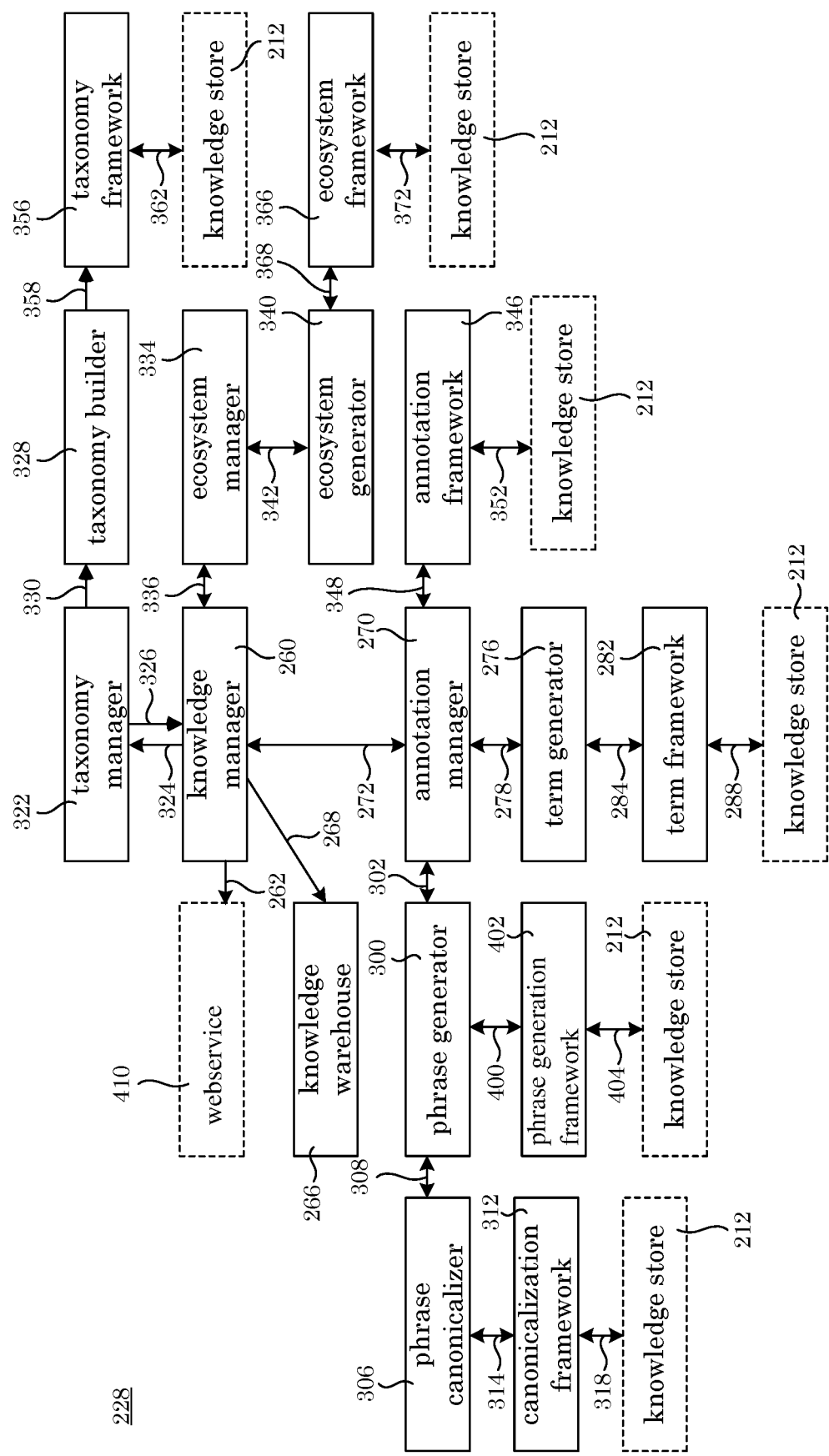
FIG. 3 shows communication of knowledge that involves a knowledge system.
Figure 4:
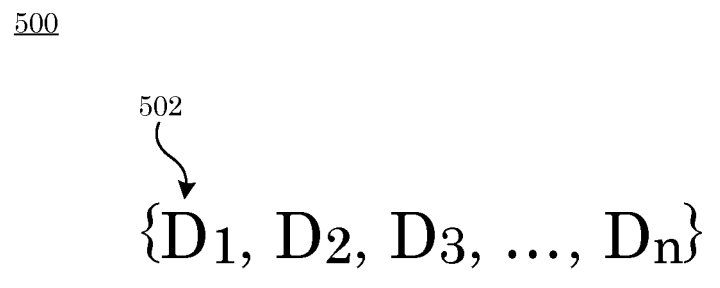
Figure 7:
FIG. 7 shows snippets of a sentence.
Figure 11:
FIG. 11 shows terms from phrases.

Knowledge management system 200 has numerous uses, including managing knowledge. In an embodiment, with reference to FIG. 2, a process for managing knowledge includes: requesting documents 262 (FIG. 4) by knowledge manager 260; communicating 262 (FIG. 4) to knowledge manager 260 from knowledge database 232; requesting build of taxonomy 324 (FIG. 37) by knowledge manager 260; communicating taxonomy 324 (FIG. 37) to knowledge manager 260 from taxonomy manager 322; requesting creation of ecosystem 336 (FIG. 12) by knowledge manager 260; communicating ecosystem 336 (FIG. 12) to knowledge manager 260 from ecosystem manager 334; requesting creation of terms 272 (FIG. 11) by knowledge manager 260; communicating terms 272 (FIG. 11) to knowledge manager 260 from annotation manager 270; and communicating ecosystem 268 (FIG. 12) to knowledge warehouse 266 from knowledge manager 260 to manage knowledge.

The process for managing knowledge also can include requesting the taxonomy builder to build taxonomy 328 (FIG. 37) by taxonomy manager 322; communicating taxonomy 330 (FIG. 37) to taxonomy manager 322 from taxonomy builder 328; requesting taxonomy building scheme 358 from taxonomy framework 356 by taxonomy builder 328; communicating taxonomy building scheme 358 to taxonomy builder 328 from taxonomy framework 356; requesting amendments to taxonomy building scheme 362 from knowledge store 212 by taxonomy framework 356; and communicating taxonomy amendments 362 to taxonomy framework 356 from taxonomy amendment store 250.

The process for managing knowledge also can include ecosystem manager 334 requesting ecosystem generator 340 to build ecosystem 342; communicating ecosystem 342 to ecosystem manager 334 from ecosystem generator 340; ecosystem generator 340 requesting scheme for creating ecosystem 368; communicating ecosystem building scheme 368 to the ecosystem generator 340 from ecosystem framework 366; requesting provision of amendments applicable to ecosystem scheme 254 by ecosystem framework 366; and communicating amendments applicable to ecosystem scheme 254 to ecosystem framework 366 from the knowledge store 212.

The process for managing knowledge also can include requesting scheme for annotation 348 by annotation manager 270; communicating the scheme for annotation 348 to annotation manager 270 from annotation framework 346; annotation framework 346 requesting amendments to the scheme for annotation 352; and communicating the amended annotation scheme 352 to the annotation framework 346 from knowledge store 212.

The process for managing knowledge also can include annotation manager 270 requesting generation of terms 278 from a sentence 602; communicating terms 278 to the annotation manager 270 from the term generator 276; term generator 276 requesting the scheme for generating terms 284; communicating the scheme for term generation 284 to term generator 276 from the term framework 282; term framework 282 requesting the knowledge store 212 for amendments to the scheme for term generation 288; and communicating the scheme for term generation 288 by the knowledge store 212 to the term framework 282.

The process for managing knowledge also can include annotation manager 270 requesting the phrase generator 300 to generate canonicalized phrases (FIG. 10) 302; communicating canonicalized phrases 302 to the annotation manager 270 from the phrase generator 300; phrase generator 300 requesting the phrase canonicalizer 306 to create canonicalized phrases 308 for roots 900; communicating canonicalized phrases 308 to phrase generator 300 from the phrase canonicalizer 306; phrase canonicalizer 306 requesting the scheme for canonicalizing 314 communicating the canonicalization scheme 314 to the phrase canonicalizer 306 from the canonicalization framework 312; canonicalization framework 312 requesting the knowledge store 212 to provide amendments if any to the scheme for canonicalizing 318; and the knowledge store 212 communicating the amendments applicable to canonicalization scheme 318 to the canonicalization framework 312.

In the process for managing knowledge, requesting documents 262 by knowledge manager 260 includes sending a signal from knowledge system 228 to knowledge database 232 along communication channel 230, asking for a new document object 502, or collection of document object elements 500.

In the process for managing knowledge, communicating documents 262 to knowledge manager 260 from knowledge database 232 includes sending a document object element 502 or a collection of document objects 500 from the knowledge database 232 to the knowledge system 228 along 230.

In the process for managing knowledge, requesting taxonomy 324 taxonomy manager 322 by the knowledge manager 260 includes sending a set of term elements 1100 from each document object element such as 506 to the taxonomy manager 322, operating system 236 stores and manages any working data.

In the process for managing knowledge, communicating taxonomy 324 to knowledge manager 260 from the taxonomy manager 322 includes a set of taxonomy elements 1150 to the knowledge manager 260, operating system 236 performs operations and manages any working data.

In the process for managing knowledge, requesting ecosystem manager 334 to build ecosystem 336 by the knowledge manager 260 includes sending each document 502, each document object element 506, a sentence 602, a snippet 702, related phrases 1000, related terms 1100, and related all phrases of taxonomy 1150 to ecosystem manager 334.

In the process for managing knowledge, communicating ecosystem 336 to knowledge manager 260 from ecosystem manager 334 includes sending a set of ecosystem elements 1200 of each document 502 to knowledge manager 260, operating system 236 performs operations and manages any working data.

In the process for managing knowledge, requesting to build terms 272 by knowledge manager 260 includes sending a document object element 506 to annotation manager 270.

In the process for managing knowledge, communicating terms 272 to knowledge manager 260 from annotation manager 270 includes sending an annotated set of terms 1100 to knowledge manager 260; operating system 236 performs operations and manages any working data.

In the process for managing knowledge, communicating ecosystem 268 to knowledge warehouse 266 from knowledge manager 260 includes sending ecosystem elements 1200 to knowledge warehouse 266. Knowledge warehouse 266 stores these ecosystem elements in the warehouse 266, sends 218 them over to network 216, or displays the ecosystems on output device 224; operating system 236 performs operations and manages any working data.

In the process for managing knowledge, requesting to build taxonomy 330 by taxonomy manager 322 includes sending a set of term such as 1100 which correspond to a document object element 506 to taxonomy builder 328. Operating system 236 performs operations and manages any working data.

In the process for managing knowledge, communicating taxonomy 330 to taxonomy manager 322 from taxonomy builder 328 includes sending a set of taxonomy elements 1150 to taxonomy manager 322.

In the process for managing knowledge, requesting to build taxonomy for snippets 358 by taxonomy builder 328 includes sending a set of terror elements (1102, 1104) to taxonomy framework 356. Taxonomy builder 328 sends each unique pair of term elements 1002 in sequence or in parallel.

In the process for managing knowledge, communicating taxonomy for snippets 358 to taxonomy builder 328 from taxonomy framework 356 includes sending a set of term elements for taxonomy 1150 and a tag defining the relationship they have for canonicalizing.

In the process for managing knowledge, requesting amendments to taxonomy building scheme 362 by taxonomy framework 356 includes sending a signal to taxonomy amendment store 250 asking for amendments to the schemes applicable to a particular object such as 506.

In the process for managing knowledge, communicating amendments to taxonomy building scheme 362 to taxonomy framework 356 from taxonomy amendment store 250 includes acquiring amendments to applicable schemes from knowledge store 212 and sending the schemes corresponding to each amendment to taxonomy framework 356.

In the process for managing knowledge, requesting to build ecosystem 342 by ecosystem manager 334 includes sending a document object and related phrases, terms, and taxonomy to ecosystem generator 340. Ecosystem manager 334 processes each document object and related phrases, terms, and taxonomy to send in sequence or in parallel.

In the process for managing knowledge, communicating ecosystem 342 to ecosystem manager 334 from ecosystem generator 340 includes sending a set of ecology elements (1202, 1204, 1206, and the like) to ecosystem manager 334.

In the process for managing knowledge, requesting scheme for building ecosystem 368 by ecosystem generator 340 includes sending a document object 506 and related phrases, terms, and taxonomies to ecosystem framework 366.

In the process for managing knowledge, communicating scheme for building ecosystem 368 to ecosystem generator 340 from ecosystem framework 366 includes sending ecology elements to ecosystem generator 340.

In the process for managing knowledge, requesting amendments to ecosystem building scheme 372 by ecosystem framework 366 includes sending a signal to taxonomy amendment store 250 asking for amendments for taxonomy building scheme from knowledge store 212.

In the process for managing knowledge, communicating amendments to ecosystem building scheme 372 to ecosystem framework 366 from knowledge store 212 includes acquiring ecosystem amendment store from 256 and sending each amendment to ecosystem framework 366.

In the process for managing knowledge, requesting annotation scheme 348 annotation framework to provide scheme for annotation by annotation manager 270 includes sending a document object 506 to annotation framework 346.

In the process for managing knowledge, communicating annotation scheme 348 to annotation manager 270 from annotation framework 346 includes sending annotation scheme to annotation manager 270.

In the process for managing knowledge, requesting annotation scheme 352 to knowledge store 212 by annotation framework 346 includes sending a signal to knowledge store 212 asking for amendments for annotation scheme.

In the process for managing knowledge, communicating annotation scheme 352 to annotation framework 346 from knowledge store knowledge store 212 includes acquiring amendments from annotation amendment store 252 and sending them to annotation framework 346.

In the process for managing knowledge, requesting to create terms 278 by annotation manager 270 includes sending a set of phrase elements (e.g., 1002, 1004, and the like) from each document to term generator 276.

In the process for managing knowledge, communicating terms 278 to annotation manager 270 from term generator 276 includes sending a set of term elements (e.g., 1102, 1104, and the like) to annotation manager 270.

In the process for managing knowledge, requesting term generation scheme 284 by term generator 276 includes sending a single phrase element to term framework 282. Term generator 276 selects each phrase in sequence or in parallel and sends it to term framework 282.

In the process for managing knowledge, communicating term generation scheme 284 to term generator 276 from term framework 282 at most one term element to term generator 276. The term corresponds to the most recent request.

In the process for managing knowledge, requesting amendments to term generation scheme 288 by term framework 282 includes sending a signal to knowledge store 212 asking for amendments from term amendment store 258.

In the process for managing knowledge, communicating amendments to term generation scheme 288 to term framework 282 from knowledge store 212 includes acquiring amendments from term amendment store 258 and sending each amendment to term framework 282.

In the process for managing knowledge, requesting to generate phrases 302 by annotation manager 270 includes sending each annotated snippet (702, 704) to phrase generator 300.

In the process for managing knowledge, communicating phrases 302 to annotation manager 270 from phrase generator 300 includes sending a set of phrases 1000 to annotation manager 270.

In the process for managing knowledge, requesting canonicalized phrases 308 by phrase generator 300 includes sending a phrase element to phrase canonicalizer 306 to create canonicalized phrases 900. Phrase generator 300 sends each phrase from the annotated document object to phrase canonicalizer 306 in sequence or in parallel.

In the process for managing knowledge, communicating canonicalized phrases 308 to phrase generator 300 from phrase canonicalizer 306 includes sending a canonicalized phrase element (902, 904) to the phrase generator 300.

In the process for managing knowledge, requesting 314 by phrase canonicalizer 306 includes sending words 800 to canonicalization framework 312.

In the process for managing knowledge, communicating scheme for canonicalizing 314 to phrase canonicalizer 306 from canonicalization framework 312 includes sending a canonicalized phrases (902, 904) to the phrase canonicalizer 306.

In the process for managing knowledge, requesting amendments to canonicalization scheme 318 by canonicalization framework 312 includes sending a signal to knowledge store 212 asking for amendments to canonicalizing scheme from canonicalization amendment store 254.

In the process for managing knowledge, communicating amendments to canonicalizing scheme 318 to canonicalization framework 312 from knowledge store 212 includes acquiring amendments from canonicalization amendment store 254 and communicating them to canonicalization framework 312.

It is contemplated that default knowledge system 210 can include a personal computer or a shared computing resource or a cloud computing to create an ecosystem 1200 for an individual or a collection of documents 500 and can be a document 502, or a collection of document 500, and elements shown in FIG. 5 through FIG. 12 and FIG. 37 that creates a series of evolving modules as the basis of the knowledge management system.

The process for managing knowledge can also include modularizing a document 502 to a plurality of objects 504 that can be defined and customized to individual needs such as of a discipline, federation, or an application. For a scientific paper, these objects can be an abstract, introduction, experimental section etc.

The process for managing knowledge also can include modularizing an object 506 further to individual sentences such as 602

Further, the process for managing knowledge also can include modularizing each sentence such as 602 into a plurality of snippets such as 700 so that the knowledge held in the knowledge warehouse 266 reveal the local semantics of the words of a sentence.

Further, the process for managing knowledge also includes modularizing a snippet such as 702 into individual words such as 802.

Further, the process for managing knowledge also can include canonicalizing the words 800 into canonicalized words such as 900 so that effect of synonyms, short forms, jargons, and the like are reduced in the knowledge warehouse.

Further, the process for managing knowledge also includes converting the canonicalized words 900 into phrases such as 1000 so that linguistic artifacts of constructing sentences using the same set of words in multiple ways to mean the same semantics are reduced in the knowledge held in the knowledge warehouse.

Further, the process for managing knowledge also includes creating terms 1100 from two or more phrases so that knowledge held in the knowledge warehouse 266 can discriminate between many related semantics not clarified by individual phrases.

Further, the process for managing knowledge also includes constructing the taxonomy 1150 from terms such as 1100 so that the knowledge held in the knowledge warehouse 266 reflects use-case specific preferences and hierarchies for clustering knowledge for search and discovery purposes.

Further, the process for managing knowledge also includes constructing an ecosystem 1200 where relationships between the components of the knowledge concept (500 to 1150) are marked in the warehouse so that the components of a knowledge concept can evolve or interact during or after their creations such as during a search and discovery process.

The properties of default knowledge system 210 includes an operating system capable of performing the instruction received from the default knowledge system 210 and receiving input from the input device 220 and sending output to the output device 224 and communicating with networked devices such as network 216. In an embodiment, default knowledge system 210 includes a computing resource such as a cluster of computers, a cloud computing or a dedicated computing resource such a personal computer, or a resource configured to perform tasks for knowledge management system 210. In an embodiment, the resource is a computer such as an Apple laptop, Dell laptop and a Dell desktop running an operating system such as Lynx Windows.

In knowledge management system, knowledge store 212 can include many processes such as taxonomy amendment store 250, annotation amendment store 252, canonicalization amendment store 254, ecosystem amendment store 256, term amendment store 258, phrase amendment store 259 or any other amendments for that may impact the linguistic framework used by the knowledge system to create the ecosystem 1200 for a plurality of documents. In an embodiment, the knowledge store 212 may be implemented as a device which accepts computer-readable storage media, a user input device which allows for the creation of new amendments in a programming language, as a connection to a network which contains amendments, or any other device capable of communicating amendments (e.g., in the form of computer code) to the default system to create an ecosystem that is specific to use-case or a discipline or a particular application, to provide amendments to the linguistic framework used by the default knowledge system 228. The linguistic framework used by the default knowledge system 228 can be a plurality of scheme used by the default knowledge system 228 in carrying the steps outlined in this document while creating the ecosystem 1200. Moreover, these linguistic frameworks may be amended through a plurality of processes managed by the knowledge store 212. In an embodiment, knowledge store knowledge store 212 includes.

In knowledge management system 200 network 216 can include many networks such as a local network connected to a limited number of devices within a group of customers or institutional network connecting the customers of an institution or a public network connected to publicly accessed devices. In our implementation, we used both a local network and an institutional network.

In knowledge management system 200 input device 220 can include many types input devices such as a static device or an interactive device either connected locally or remotely or as a web service. Each of these types of devices can be a flat file system or a database.

In the knowledge management system 200 output device 224 can be a static flat system or a database or visual display device or webservice.

In the knowledge management system 200, knowledge system 228 is a process that upon activation creates the ecosystem 1200 for a plurality of documents 500. This process comes with all the features including but not limited to the default scheme for creating ecosystem 1200. This process can receive amendments to the default scheme for creating ecosystem from a knowledge store 212. The knowledge store 212 can be located locally or remotely and the knowledge store 212 can be used by customers to fine-tune the process of creating ecosystem 1200 to a specific application or a discipline. Biological science and material science are just two such examples of disciplines.

In the knowledge management system 200 knowledge database 232 includes both a scheme database for annotation and working database to create and manage intermediate results that get communicated between processes during the different steps of creating the ecosystem 1200. The scheme database includes the default scheme used by processes that create elements of shown in FIG. 4 to FIG. 12. The intermediate results managed by the knowledge database 232 include but not limited to the information to be exchanged between the processes that create elements shown in FIG. 4 to FIG. 12 and FIG. 37.

In the knowledge management system 200 operating system 236 includes any vendor provided operating system that comes with a computer and capable of providing the basic operating capability of the process. We have tested the knowledge system 228 both in Lynx and Window's operating systems.

In the knowledge management system 200 taxonomy amendment store 250 consists of a taxonomy amendment process and a taxonomy amendment data store. The taxonomy amendment data store itself can be a flat file system or a database. Taxonomy amendment process can be one or more of software code or data processing stored procedure. The taxonomy amendment data store itself can be a set several amendment data stores specialized to a specific type of discipline and or data object In the knowledge management system 200 annotation amendment store 252 consists of an annotation amendment process and an annotation amendment data store. The annotation amendment data store itself can be a flat file system or a database. Annotation amendment process can be one or more of software code or data processing stored procedure. The annotation amendment data store itself can be a set several amendment data stores specialized to a specific type of discipline and or a data object.

In the knowledge management system 200 canonicalization amendment store 254 consists of a canonicalization amendment process and a canonicalization amendment data store. The canonicalization amendment data store itself can be a flat file system or a database. Canonicalization amendment process can be one or more of software code or data processing stored procedure. The canonicalization amendment data store itself can be a set several amendment data stores specialized to a specific type of discipline and or a data object.

In the knowledge management system 200 ecosystem amendment store 256 consists of an ecosystem amendment process and an ecosystem amendment data store. The ecosystem amendment data store itself can be a flat file system or a database. Ecosystem amendment process can be one or more of software code or data processing stored procedure. The ecosystem amendment data store itself can be a set several amendment data stores specialized to a specific type of discipline and or a data object.

In the knowledge management system 200 term amendment store 258 consists of a term amendment process and a term amendment data store. The term amendment data store itself can be a flat file system or a database. Term amendment process can be one or more of software code or data processing stored procedure. The term amendment data store itself can be a set several amendment data stores specialized to a specific type of discipline and or a data object.

In the knowledge management system 200 phrase amendment store 259 consists of a phrase amendment process and a phrase amendment data store. The phrase amendment data store itself can be a flat file system or a database. Phrase amendment process can be one or more of software code or data processing stored procedure. The phrase amendment data store itself can be a set several amendment data stores specialized to a specific type of discipline and or a data object.

In the knowledge system 228 canonicalization framework 312 consists of a default process for canonicalization that is applicable to a plurality of disciplines and a corresponding default canonicalization data store. Default process for canonicalization process itself can be one or more of software code and associated stored procedures. The default canonicalization data store can be plurality of flat file system or a database and associated stored procedures.

In the knowledge system 228 the term generation framework 282 consists of a default process for term generation that is applicable to a plurality of disciplines and a corresponding default term generation data store. Default process for term generation process itself can be one or more of software code and associated stored procedures. The default term generation data store can be plurality of flat file system or a database and associated stored procedures.

In the knowledge system 228 the annotation framework 346 consists of a default process for annotation that is applicable to a plurality of disciplines and a corresponding default annotation data store. Default process for annotation itself can be one or more of software code and associated stored procedures. The default annotation data store can be plurality of flat file system or a database and associated stored procedures.

In the knowledge system 228 the ecosystem generation framework 366 consists of a default process for ecosystem that is applicable to a plurality of disciplines and a corresponding default ecosystem data store. Default process for ecosystem itself can be one or more of software code and associated stored procedures. The default ecosystem data store can be plurality of flat file system or a database and associated stored procedures.

In the knowledge system 228 the taxonomy framework 356 consists of a default process for taxonomy that is applicable to a plurality of disciplines and a corresponding default taxonomy data store. Default process for taxonomy itself can be one or more of software code and associated stored procedures. The default taxonomy data store can be plurality of flat file system or a database and associated stored procedures.

In the knowledge system 228 the term generator 276 consists of a default process for term generation that is applicable to a plurality of disciplines and a corresponding default term generation data store plus the information provided by the term framework 282. Default process for term generation itself can be one or more of software code and associated stored procedures. The default term generation data store can be plurality of flat file system or a database and associated stored procedures.

In the knowledge system 228 the phrase canonicalizer 306 consists of a default process for phrase canonicalization that is applicable to a plurality of disciplines and a corresponding default phrase canonicalization data store plus the information provided by the phrase canonicalization framework 312. Default process for phrase canonicalization itself can be one or more of software code and associated stored procedures. The default phrase canonicalization data store can be plurality of flat file system or a database and associated stored procedures.

In the knowledge system 228 the ecosystem generator 340 consists of a default process for building ecosystem with scheme that are applicable to a plurality of disciplines and a corresponding ecosystem data store. Default process of ecosystem generator itself can be one or more of software codes and associated stored procedures. The default ecosystem generator data store can be plurality of flat file system or a database and associated stored procedures.

In the knowledge system 228 the taxonomy builder 328 consists of a default process for building taxonomy with scheme that are applicable to a plurality of disciplines and a corresponding taxonomy data store. Default process of taxonomy builder itself can be one or more of software codes and associated stored procedures. The default taxonomy builder data store can be plurality of flat file system or a database and associated stored procedures.

In the knowledge system 228 the phrase generator 300 consists of a default process for generating phrase with scheme that are applicable to a plurality of disciplines and a corresponding phrase generation data store. Default process of generating phrase itself can be one or more of software codes and associated stored procedures. The phrase generation data store can be plurality of flat file system or a database and associated stored procedures.

In the knowledge system 228 the ecosystem manager 334 consists of a default process for controlling and administering the scheme for creating ecosystem that are applicable to a plurality of disciplines and a corresponding ecosystem management data store. Default process of managing the creation of ecosystem itself can be one or more of software codes and associated stored procedures. The ecosystem management datastore can be plurality of flat file system or a database and associated stored procedures.

In the knowledge system 228 the annotation manager 270 consists of a default process for controlling and administering the scheme for annotation that are applicable to a plurality of disciplines and a corresponding annotation management data store. Default process of managing annotating itself can be one or more of software codes and associated stored procedures. The annotation management datastore can be plurality of flat file system or a database and associated stored procedures.

In the knowledge system 228 the taxonomy manager 322 consists of a default process for controlling and administering the scheme for creating taxonomy that are applicable to a plurality of disciplines and a corresponding taxonomy management data store. Default process of managing the creation of taxonomy itself can be one or more of software codes and associated stored procedures. The taxonomy management datastore can be plurality of flat file system or a database and associated stored procedures.

In the knowledge system 228 the ecosystem manager 334 consists of a default process for controlling and administering the scheme for creating ecosystem that are applicable to a plurality of disciplines and a corresponding ecosystem management data store. Default process of managing the creation of ecosystem itself can be one or more of software codes and associated stored procedures. The ecosystem management datastore can be plurality of flat file system or a database and associated stored procedures.

In the knowledge system 228 the knowledge manager 260 consists of a default process for controlling and administering the scheme for creating knowledge that are applicable to a plurality of disciplines and a corresponding knowledge management data store. Default process of managing the creation of knowledge itself can be one or more of software codes and associated stored procedures. The knowledge management data store can be plurality of flat file system or a database and associated stored procedures.

In the knowledge system 228 the knowledge warehouse consists of a default process for controlling and managing the from documents from a plurality of disciplines and a corresponding knowledge management data store. Default process of managing and controlling knowledge can be one or more of software codes and associated stored procedures. The knowledge management datastore can be plurality of flat file system or a database and associated stored procedures In the knowledge management system 200, the operating system connection 234 manages request by the knowledge system 228 to the operating system 236 to perform individual steps of creating create the knowledge warehouse and return results. Knowledge database connection 262 manages request by the knowledge system 228 to the knowledge database 232 to manage data during the process of creating knowledge warehouse. Further, this request by the knowledge system 228 can include both data retrieval and data storage while performing one or more steps of creating the knowledge warehouse.

The network connection 218 manages request by the knowledge system 228 to one or more of the network connected devices while performing one or more of the steps of creating knowledge warehouse. These network devices can be a plurality of computers, databases, flat file systems or computer processing units.

The input connection 222 manages request by the knowledge system 228 to the input data used to perform individual steps of creating the knowledge warehouse. Moreover, these input data can come from interactive or static devices. These input data devices can be a plurality of control parameters or documents for the creation of knowledge warehouse. Moreover, the input data can come from a local data source or a webservice.

The output connection 222 manages request by the knowledge system 228 to the output data created by the individual steps of creating the knowledge warehouse. Moreover, these output data can go to interactive or static devices. These output data devices can be a plurality of intermediate results or final results of the creation of knowledge warehouse. Moreover, the output data can go to a local data source or a webservice.

The knowledge store connection 254 manages request by the knowledge system 228 to the knowledge store 212 and returns requested information. The knowledge store 212 can be a local resource or a remotely located resource connected by a network.

In the knowledge database connection 262 manages requests by the knowledge manager 260 to the knowledge database 232. The knowledge database 232 can be a local database or a remote database or a webservice that manage the documents for which the creation of knowledge ware house being carried out.

The knowledge warehouse connection 268 manages the requests by the knowledge manager 260 to the knowledge warehouse 266 during the many steps of creating the knowledge warehouse 266 for a given object such as 506.

The annotation manager connection 272 manages requests by the knowledge manager 260 to the annotation manager 270 during the steps of creating annotated terms such as 1100 for an object such as 506.

The term generator connection 278 manages the request by the annotation manager 270 to the term generator during the steps of creating words such as 800 from an object such as 506

The term framework connection 284 manages requests from the term generator 276 to the term framework 282 during the creation of words such as 800 from an object such as 506.

The term amendment connection 288 manages requests from term framework to term amendment store 258 available as a subset of knowledge store 212.

The phrase generator connection 302 manages requests from annotation manager 270 to phrase generator 300 during the creation of phrases such as 1000 from an object such as 506.

The phrase canonicalizer connection 308 manages requests from phrase generator 300 to phrase canonicalizer 306 during the creation of canonicalized roots such as 900 from words such as 800.

The phrase canonicalization framework connection 314 manages requests from phrase canonicalizer 306 to the canonicalization framework 312 during the creation of canonicalized roots such as 900 from the words such as 800.

The canonicalization amendment store connection 318 manages requests from canonicalization framework 312 to the canonicalization amendment store 254 which is available as a subset of knowledge store 212.

The annotation framework connection 348 manages requests from the annotation manager 270 to annotation framework 346 during the creation of objects such as 504, sentences such as 600, snippets such as 700 from a document such as 502.

The annotation amendment store connection 352 manages requests from annotation framework 346 to the annotation amendment store 252 which is available as a subset of knowledge store 212.

The ecosystem manager connection 336 manages requests from the knowledge manager 260 to the ecosystem manager 334 during the creation of ecosystem such as 1200 for an object such as 506 of a document such as 502.

The ecosystem generator connection 342 manages requests from ecosystem manager 334 to the ecosystem generator 340, during the creation of an ecosystem such as 1200 for an object such as 506 of a document such as 502.

The ecosystem framework connection 368 manages requests from ecosystem generator 340 to the ecosystem framework 366 during the creation of an ecosystem such as 1200 for an object such as 506 of a document such as 502.

The ecosystem amendment store connection 372 manages requests from the ecosystem framework 366 to the ecosystem amendment store 256 during the creation of an ecosystem such as 1200 for an object such as 506 of a document such as 502.

The taxonomy manager connection 324 manages requests from knowledge manager 260 to the taxonomy manager 322 during the creation of taxonomy such as 1150 from an object such as 506 of a document 502.

The taxonomy builder connection 330 manages requests from taxonomy manager 322 to taxonomy builder 328 during the creation of taxonomy such as 1150 from an object such as 506 of a document 502.

The taxonomy framework connection 358 manages requests from taxonomy builder 328 taxonomy framework 356 during the creation of taxonomy such as 1150 from an object such as 506 of a document 502.

The taxonomy amendment store connection 362 manages requests from taxonomy framework to taxonomy amendment store 250 which is available as a subset of knowledge store 212.

It should be appreciated that the process for managing knowledge produces and uses several data types. Exemplary data types are shown in FIG. 5, FIG. 6, FIG. 7, FIG. 8, FIG. 9, FIG. 10, FIG. 11, FIG. 37 and FIG. 12. In this regard, a document can include any structured, unstructured, or semi-structured source of natural language text in digital format, so the system is able to use many types of textual data and can be useful even with inconsistent or messy data.

In this regard, a document object can include one or more textual data components to represent different aspects of a document and there can be fields describing a document's title, abstract, different sections, or others. In an embodiment, the document object includes data stored in computer memory or in a computer-readable medium.

In this regard, a sentence can include any unstructured sample of natural language to represent a single natural language sentence in text and can be a string of encoded characters. In an embodiment, the sentence includes data stored in computer memory or in a computer readable medium.

In this regard, a snippet can include a part of a sentence that represent a semantics or any sequence of canonicalized roots combined according to a set of amendments to represent a term or subpart of a term. In an embodiment, the snippet includes data stored in computer memory or in a computer-readable medium.

In this regard, a word can include any unstructured sample of natural language to represent a single natural language word, as defined by the annotation amendments 252. In an embodiment, the word includes data stored in computer memory or in a computer-readable medium.

In this regard, a canonicalized root can include a word of natural language that adheres to a set of canonicalization amendments 254. In an embodiment, the canonicalized root includes data stored in computer memory or in a computer readable medium.

In this regard, a phrase can include any unstructured sample of natural language to represent a recursive linguistic unit of syntax. A phrase is represented as a list of adjacent words. In an embodiment, the phrase includes data stored in computer memory or in a computer-readable medium.

In this regard, a term can include any snippet intended to represent an important concept in a domain. A term can be distinguished from a snippet only in its intended use. In an embodiment, the term includes data stored in computer memory or in a computer-readable medium.

In this regard, a taxonomy may include may include a description or identification of a document or its part of such as an object, sentence, snippet or concept using phrases or terms. In an embodiment, the taxonomy includes data stored in computer memory or in a computer-readable medium In this regard, an ecosystem can include any relation between document objects, phrases, and terms. An ecosystem relates terms to the phrases and documents they are found in, and relates terms to other terms to described hyponyms and hypernyms in a taxonomy, and most importantly from an ecological point of view, the interrelations and interactions represented by the terms in the taxonomy. Terminologies, taxonomies, and concept ecologies represent the contexts in which terms are used in such a way as to manage their potential ambiguity and vagueness. In an embodiment, the term includes data stored in computer memory or in a computer-readable medium.

Knowledge management system and processes herein have numerous advantageous and beneficial properties over conventional combinatorial methods of knowledge generation. Advantageously and unexpectedly knowledge management system 200 has a time complexity up to $n^{**}m$ ("n to the power m"), wherein n is an integer for a total number of distinct words in a knowledge management system, and m is an integer for a number of words per phrase generated. With regards to FIG. 22, m can be from 1 to 15. Moreover, in an exemplary document such as an abstract of a scientific research article, n can be a couple of hundreds. Moreover, knowledge management system provides integration of both machine learning techniques such as topic modeling with formal distributional and compositional computational linguistic models. On a single document, this system runs from $O(n2)$ to $O(n5)$ time, depending on the amendments present in the system, were n is the number of words in the document, as provided in amendments. When run on multiple documents, the system runs in $O(m)$ time, where m is the number of documents. The use of formal distributional and compositional linguistic models together with machine learning techniques results in a system that can be adapted with amendments and updated to account for new knowledge or data.

The articles and processes herein are illustrated further by the following Example, which is non-limiting.

Example

Automatically and adaptably building indexes and knowledge representations from very large technical document collections.

A process for managing knowledge can be root and rule-based to automatically derive building blocks of information systems. The building blocks can be used in the derivation of indexes that support query elaboration in search and taxonomies/concept ecologies that support elaboration of research areas, technologies and industrial advancement. The process provides a unified manner for transforming linguistic output into meaningful structures of related terms that are organized from simple to complex or from general to specific and are useful for query elaboration, keyword selection and taxonomy and concept ecology building. The process also can incorporate different linguistic techniques and can be applied to different domain contexts.

The process derives building blocks for information systems in different domains and contexts and provides, e.g., indexing large document collections in technical domains by grouping related terms from simple to complex; selecting keywords for individual documents according to whether they are root and rule-based terms that add specificity or generality to a document collection index or exhibit a relatively higher frequency of occurrence in the individual document as compared to other documents in the collection. The process can produce explicit taxonomies and concept ecologies from a document collection index that can support detection, tracking, and combining ideas from scientific and technical domains as well as economic markets into novel concepts as a basis for new scientific research or the creation of new technologies.

In indexing, derived terms are normalized and automatically grouped into synonymous phrases with different syntax and explicit hierarchies of general to more and more specific topics. These provide the basis for automatically suggesting query terms for search, selecting keywords for individual documents and automating the construction and updating explicit taxonomies. Frequency may not be a sole property of a term that makes it a candidate for search, keyword selection, or taxonomic insertion. Accordingly, relatively rare terms can be included for search and contribute to knowledge organization, e.g., in detection of novel concepts.

The process includes extraction of phrases based on the syntactic annotation of text contained in a document collection. Construction of terms can be based on the phrases. The process can be used in a default system that can be modified and extended. The default system produces a phrase output for which a generation of terms, indexes, keywords, taxonomic and ecological entries depends. After a document collection is provided, the process extracts a first phrase of the first document.

If the first phrase is a simple phrase (i.e., a phrase that does not include a preposition or syntactic connective), the process adds the phrase to a collection of extracted phrases. Here, the phrase is not broken down any further even if it contains two or more words that could stand alone as single word phrases. This can exclude articles that include "a," "the," and the like.

If the first phrase is a complex phrase (i.e., a phrase that includes a preposition or syntactic connective), the process extracts complex phrases contained in the original complex phrase and simple phrases within the complex phrases.

It should be appreciated that a single word terms can be generated. Some single words terms can be made but not single word terms from multi-word phrases. Parsing simple multi-word phrases can produce single word terms that may not aid elaborating search queries or that should not be included at a higher level of a taxonomic term hierarchy. It is contemplated that, e.g., in a cyber security domain, limiting parsing in this manner can prevent a simple multi-word phrase such as "cross-site scripting" from being further processed into single word terms such as "cross," "site," or "scripting."

The default system determines whether incorporating computational linguistic techniques is useful for constructing the building blocks of information systems. If such techniques do not add value to generating more useful building blocks than what is achieved by the default system, they are not incorporated.

With reference to FIG. 13, A is a data type for bare phrase structure annotations, which are represented as algebraic data types shown in FIG. 13. Each leaf contains a token, a string representing a single lexical item. Other nodes contain a left subtree and a right subtree. The head field indicates whether the left subtree or right subtree contains the syntactic head of the phrase. Elements in A may also contain features, which can be used to represent additional information about linguistic structures, including syntactic category (e.g., part of speech), dependency type, and the like.

With reference to FIG. 14, D is a data type used for documents, which are represented as records as shown in FIG. 14. When the value of the annotation field is unknown or unimportant, we sometimes do not explicitly represent the value of this field.

With reference to FIG. 15, T is the data type used for root- and rule-based terms and their metadata, which are represented as records as shown in FIG. 15. Again, when the annotations or document values are unknown or unimportant, we sometimes do not explicitly represent them.

It is contemplated that X is an arbitrary type used for taxonomic representations of root- and rule based terms. Taxonomic representations can be any type; in some cases, they may be identical to the term type T. There is one requirement for the type X: that it be possible to recover the term object corresponding to a particular element of type X. This is generally assumed to be in the term field.

Figure 16:
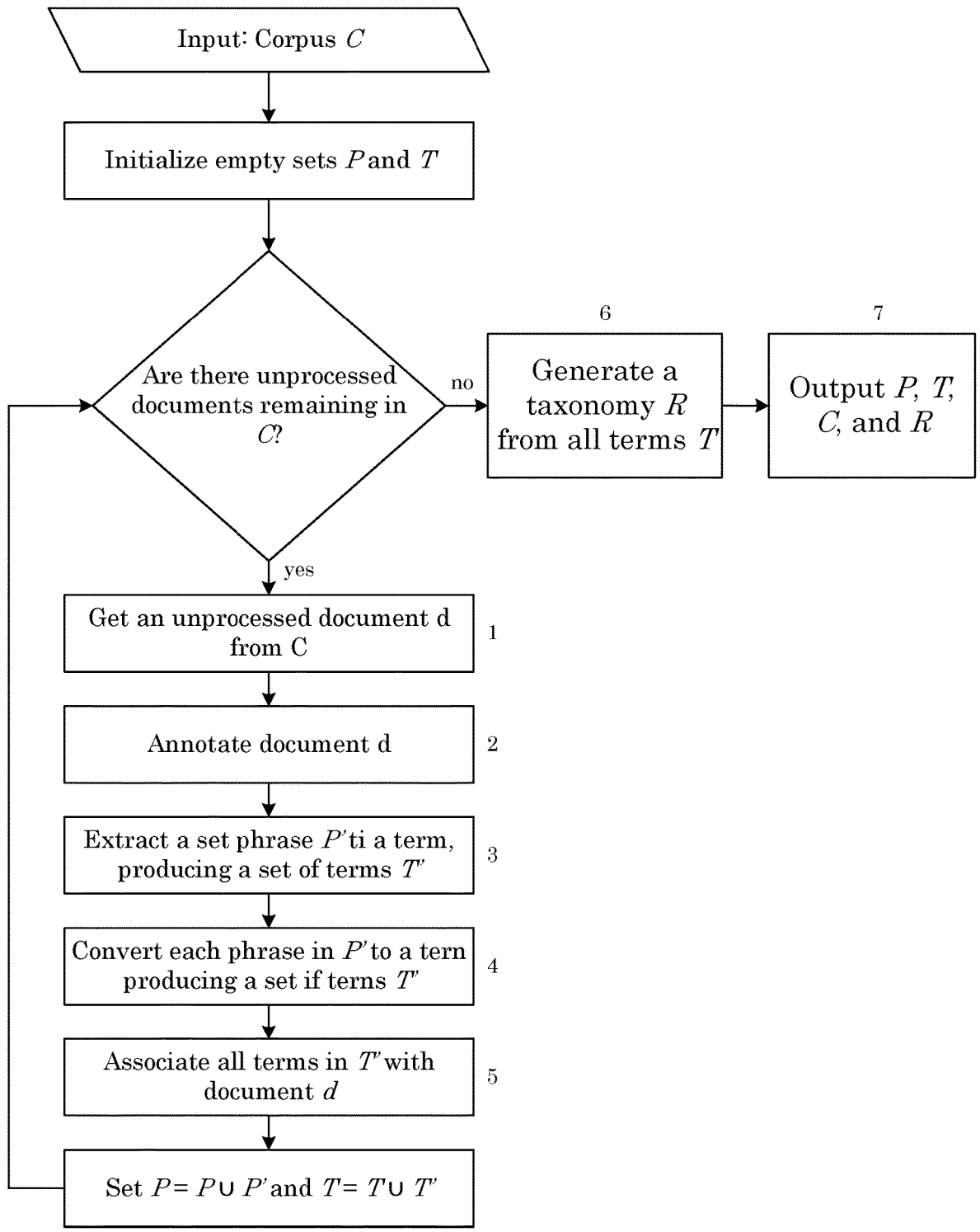
FIG. 16 shows production of terms, phrases, and relations.

With reference to FIG. 16, an input to the process includes a corpus of natural language documents. This corpus is a collection of document records that contains natural language content that can be represented as a string and a field for annotations. The annotation field is initially empty, and is filled in step 2. The process includes a general framework that supports various linguistic and text processing models as exchangeable modules.

The result of the process includes a set of terms and relations between them as well as metadata indexing the terms to documents in the corpus. The results and specified parameters can be a domain-specific ecology, wherein each domain's ecology can evolve independently and follow same standards.

The process iterates over every document d in the corpus (step 1). Each document is annotated (step 2). This fills the annotation field of d,ANNOTATION. A set of phrases P' is extracted from the annotated document d (step 3). Terms in T' are associated with the current document, d, filling the document field of each term (step 4). This association could be used, for example, to index documents by term or to identify the concepts discussed in a document. The process updates the values of P and T with P' and T' (step 5). A taxonomy is generated from the terms in T (step 6). The process terminates, returning the terms in T, phrases in P, relations in R, and the modified corpus C (step 7). Pseudocode for these steps is shown in FIG. 17.

If the process is processing a single document containing the following text, then the input C would be a singleton list containing a document structure with the given text as its content field.

An experimental study of a wing in a propeller slipstream was made in order to determine the span wise distribution of the lift increase due to slipstream at different angles of attack of the wing and at different free stream to slipstream velocity ratios. The results were intended in part as an evaluation basis for different theoretical treatments of this problem.

The document object is shown in FIG. 18. Results of the process can depend on various additional parameters.

Figure 19:
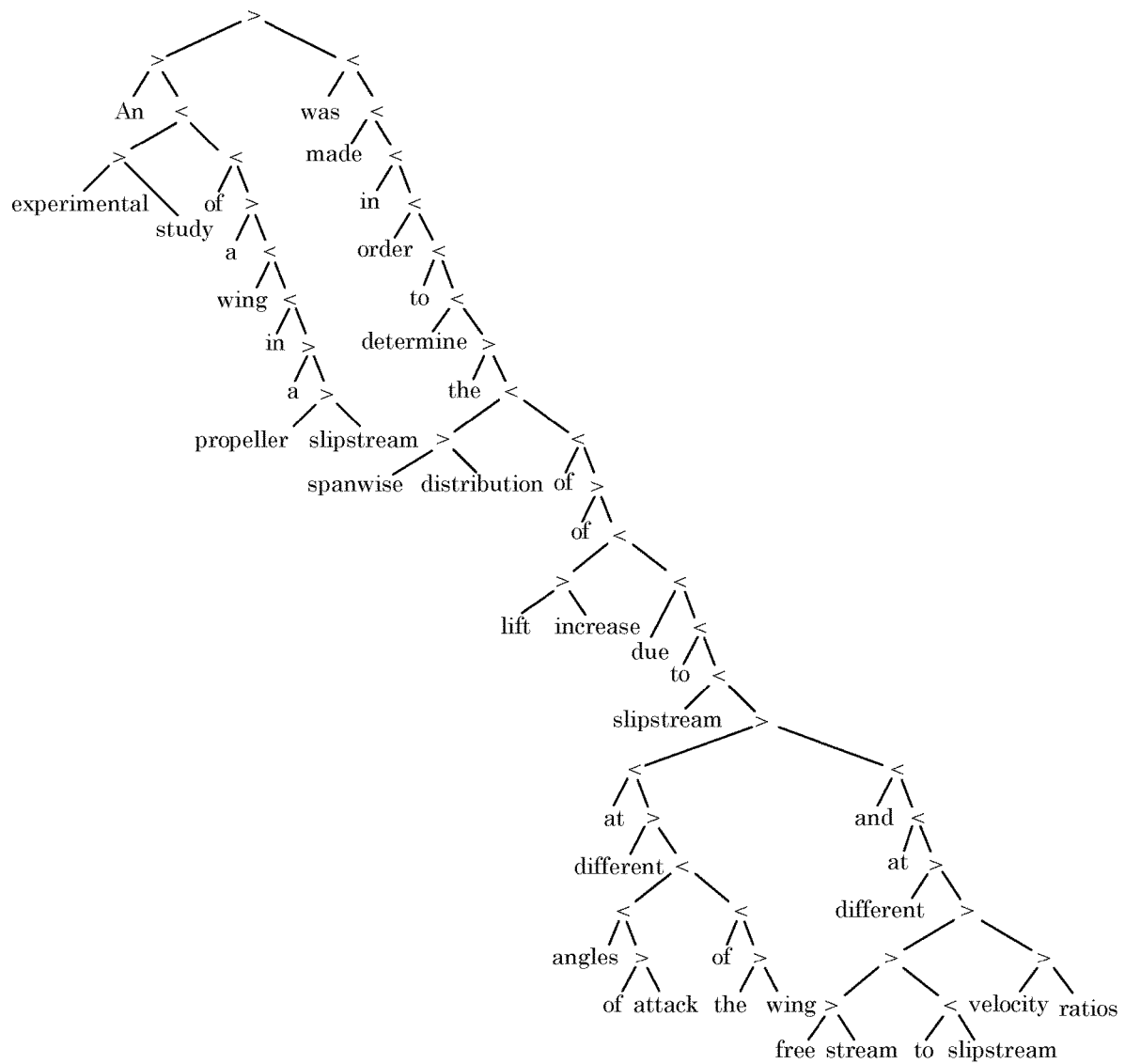
FIG. 19 shows a phrase structure tree.
Figure 20:
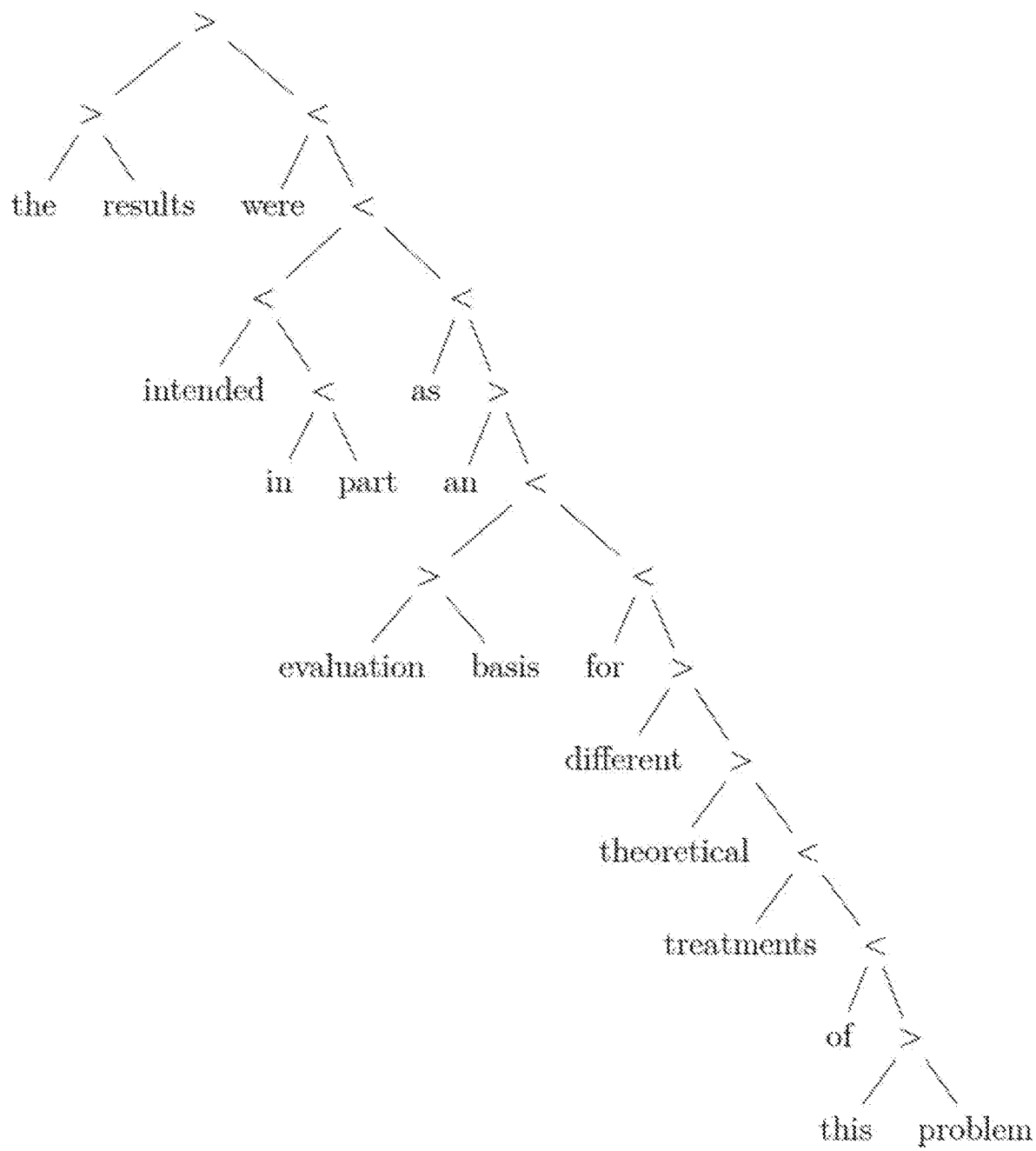
FIG. 20 shows a phrase structure tree.

It is contemplated that the process selects the only document from the corpus. This is assigned to the variable d. The document is annotated. This can produce a list of annotations, and each of which represents a syntactic structure of a sentence. FIG. 19 and FIG. 20 are show exemplary phrase structures tress from sentences in the small corpus provided above. A set of phrases P' is extracted from the annotated document d. It is contemplated that the process can extract the phrases shown in FIG. 21 from annotations shown in FIG. 19. In FIG. 21, phrases are strings, but each phrase can be paired with a subtree that produced it. Each phrase is shown in brackets. Non-default implementations may find different sets of phrases. Adjusting the set of extracted phrases can be performed by the process.

In the process, phrases in P' are converted to a set of terms T'. The default implementation produces terms shown in FIG. 22 from the phrases given above. Here, the process has used delimiters such as ":0:", ":1:", ":2:", etc. to indicate syntactic precedence. The original bare phrase structure tree can be recovered by combining elements in order of precedence, starting with 0. The same term may be generated multiple times, but because T' is a set, these repetitions are not represented. For some applications, it may be useful to track frequency of each term in the document.

In the process terms in T' are associated with the current document, d, filling the document field of each term. This association could be used, e.g., to index documents by term or to identify the concepts discussed in a document. The process updates P and T with P' and T'. A taxonomy is generated using the terms in T'. The default implementation produces taxonomic relations shown in FIG. 23 from the phrases given above. Related terms are grouped together with the frequency of each term given in parentheses. Terms are sorted from general to specific, but this provides information that could be used to sort taxonomies in different ways depending on user needs.

The process terminates, returning the terms in T, phrases in P, relations in R, and the modified corpus C.

The process selects a document, referred to as d, from the set of documents in the corpus that have not been processed. The structure of each document d is shown in FIG. 14. In pseudocode, this corresponds to line 2 of the Main procedure.

Figure 24:
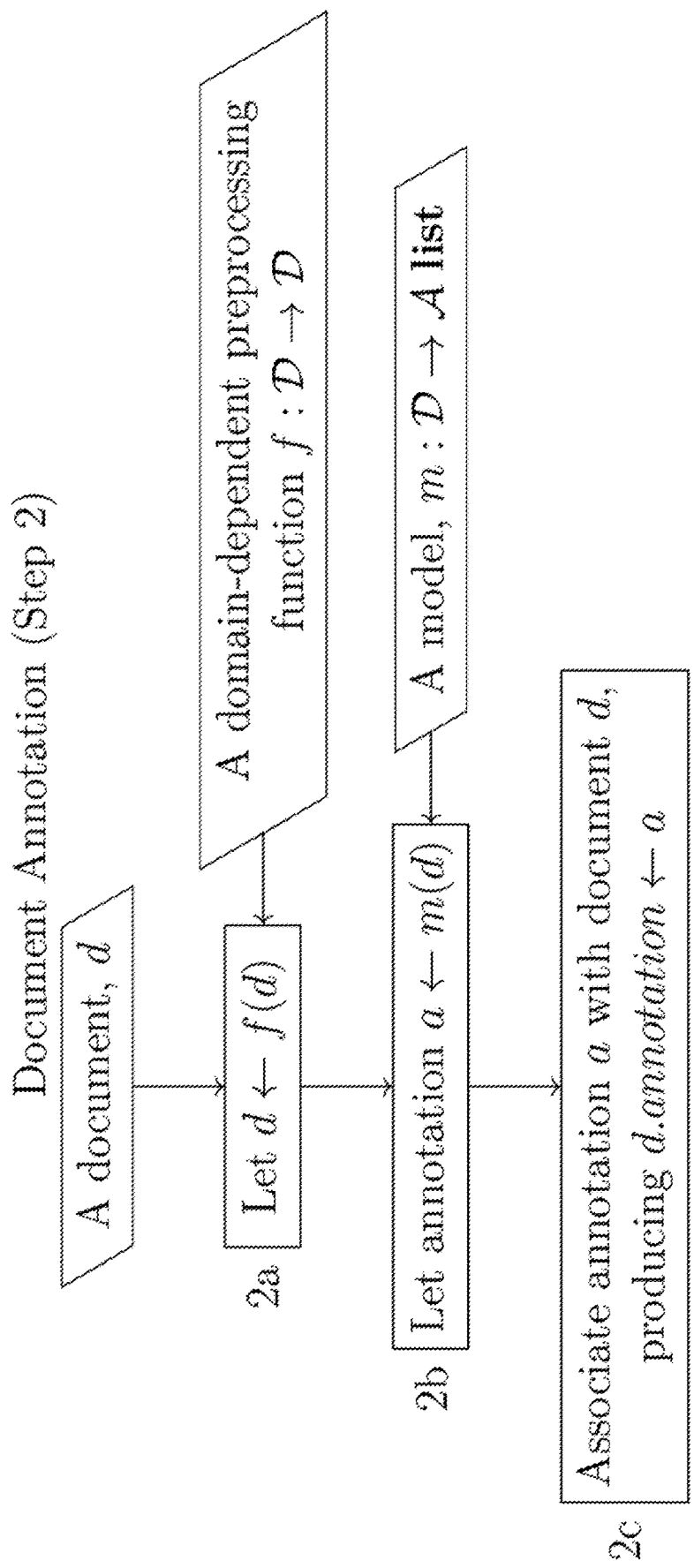
FIG. 24 shows document annotation.

With reference to FIG. 24, the input to the document annotation subroutine is a single document, d, as well as two external components: a domain-dependent preprocessing function, f, and a model, m, f may be any function which takes and returns a document. As an example, f may take a document and remove all non-linguistic content (e.g., HTML markup or mathematical expressions). The model, in, is a function which takes a document and returns an annotation. The structure of an annotation is shown in FIG. 13. This structure represents a bare phrase structure tree similar to those used in some formulations of minimalist grammars.

In the process, the document d is updated with the result of applying f to d, and an annotation a is created by applying m to d, wherein the value of the annotation field for d is set to a. FIG. 25 shows pseudocode for these steps.

The function m can be a language model provided by a natural language processing toolkit such as Stanford CoreNLP or SpaCy. Though these models produce dependency trees, dependencies can generally be converted into bare phrase structure trees regularly.

Figure 26:
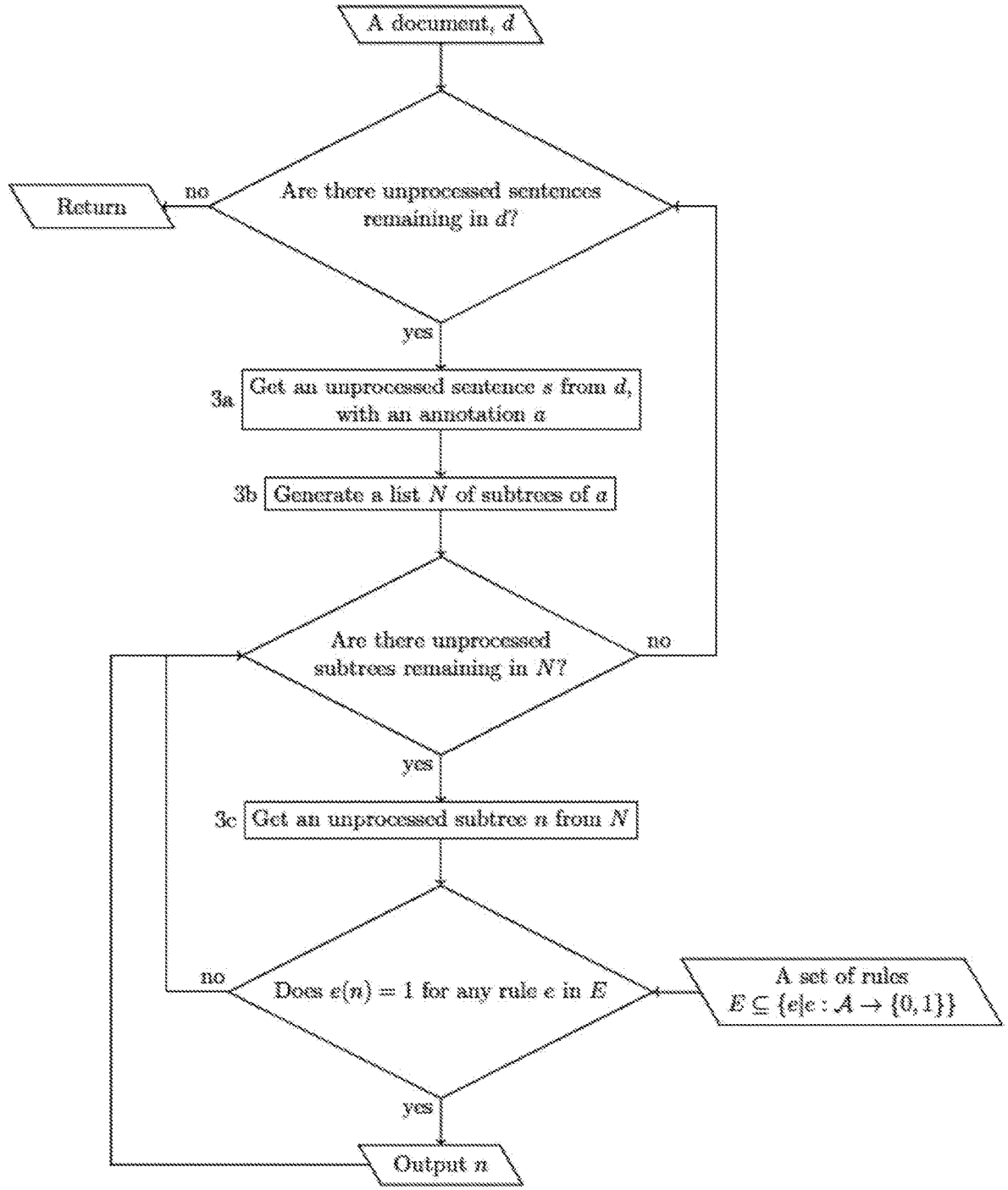
FIG. 26 shows phrase extraction.

With reference to FIG. 26, the input to the phrase extraction subroutine is a single document, d, which has by now been updated with the results of the preprocessor f and the model m. The subroutine is also given a set of scheme E, each of which is a function that takes an annotation and returns a Boolean. Here, the subroutine iterates over every sentence described by d:annotation. The current sentence is henceforth referred to as s. Note that s follows the structure shown in FIG. 13. A set of subtrees N of a are obtained. Only subtrees which consist of more than one word or which have a sister node that consists of more than one word are included. The subroutine iterates over every subtree in N for the current sentence s. The current subtree is henceforth referred to as n. For each n, the subroutine asks whether e(n)=1 for any rule e in E. If yes, n will be output as part of a collection of phrases P'. Otherwise, n is not returned and the subroutine continues to the next value for n. FIG. 27 shows pseudocode for these steps. Here, Subtrees(a) is a function which returns the list of acceptable subtrees of an annotation object a. In the default system, this includes only subtrees that includes more than one word or that have a sister including more than one node. This process is shown in pseudocode in FIG. 28. The set of scheme E might contain the following rule, written as a pseudocode function. This refers to the features of nodes in the tree. This identifies noun phrases, which are good candidates for technical terms in many domains. FIG. 29 shows pseudocode for an extraction rule that produces the phrases given above when applied to the example annotation.

Figure 30:
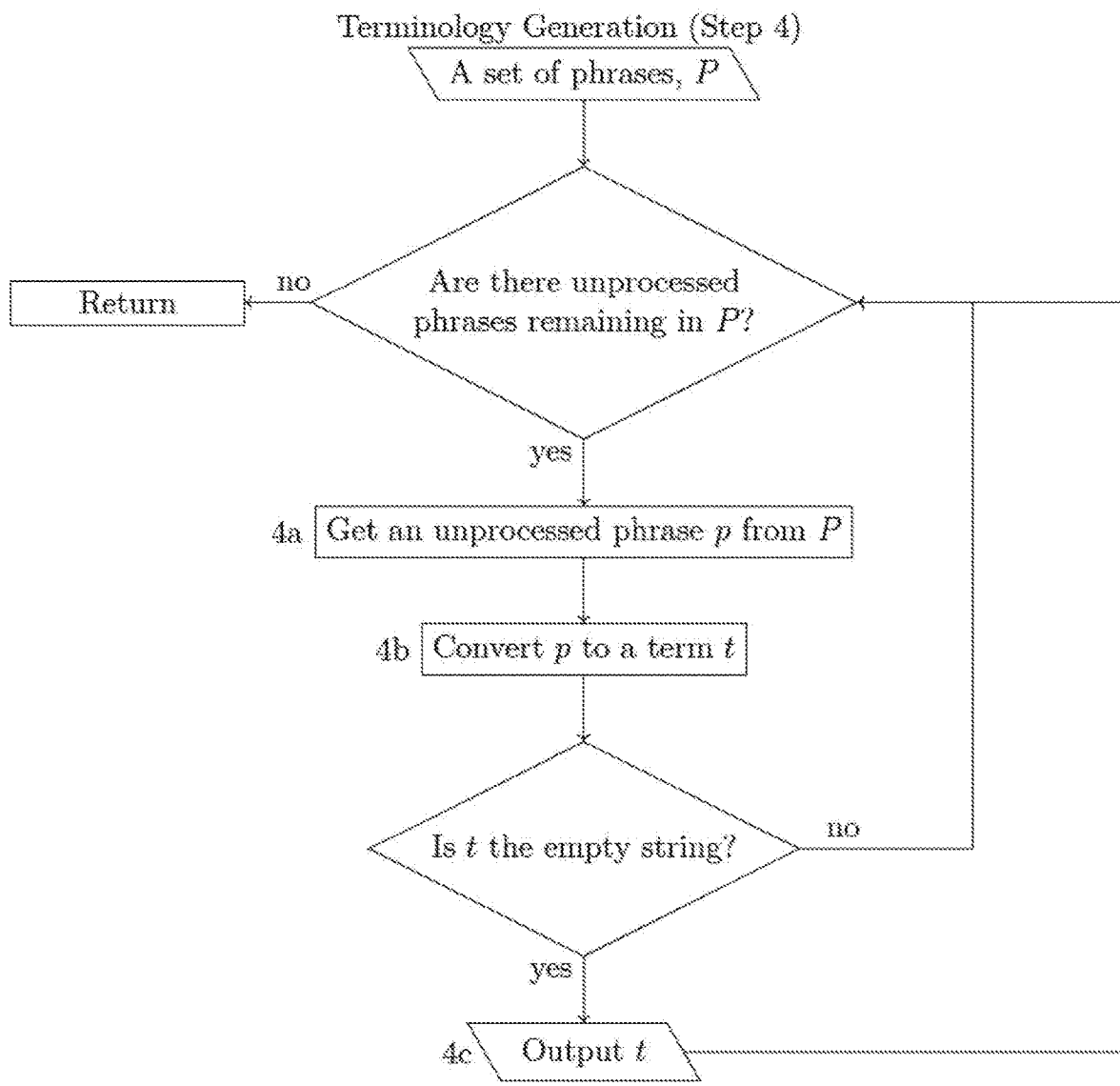
FIG. 30 shows terminology generation.

With regard to FIG. 30, the input to the terminology generation subroutine is a set of phrases, P'. This subroutine relies on another subroutine, namely a terminology conversion subroutine. Here, an empty set T' of terms is created. The subroutine iterates over every phrase in P'. The current phrase is henceforth referred to as p. Once every phrase has been processed, the subroutine returns the set of all terms t that have been selected. Phrase p is converted into a term t. If t is the empty string, then it is ignored and the subroutine moves on to the next phrase in P'. Otherwise, t is added to T'. Pseudocode for these steps is shown in FIG. 31. The terminology generation subroutine can iterate over the phrases given above, and call Convert on each of them.

Figure 32:
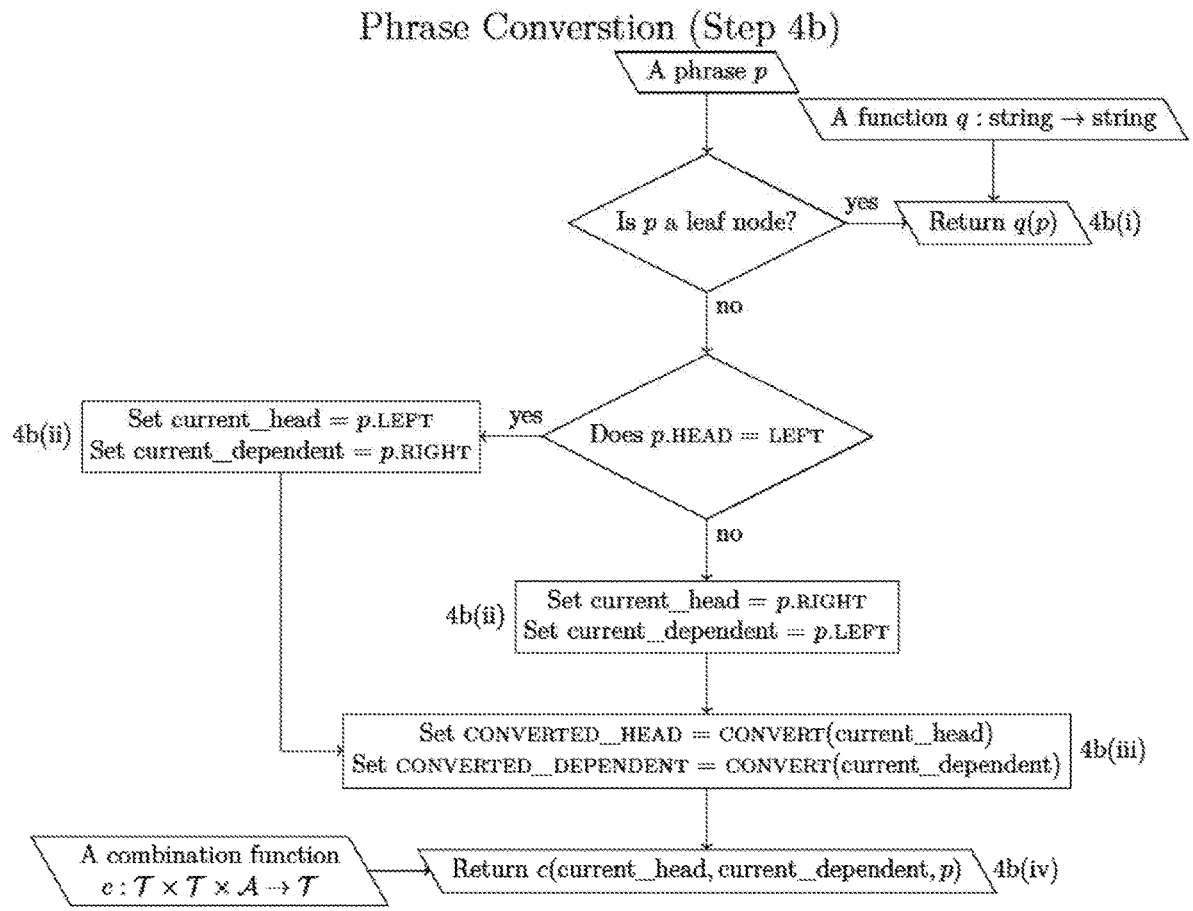
FIG. 32 shows phrase conversion.

With reference to FIG. 32, the input to the terminology conversion subroutine is a single phrase, p. The subroutine is also given a conversion function q which maps strings to strings, and a combination function c which maps triples containing two terms and an annotation. As examples, the conversion function may be a lemmatizer, stemmer, or stop word filter. The combination function c combines two terms into a single term, using whatever information from c may be useful. In the default system, c combines the terms using the height of the bare phrase structure tree of the given annotation, excluding stop words. If the height is 0, then the two input terms are connected by the delimiter ":0:". If the height is 1, then the two input terms are connected by the delimiter ":1:" and so on. The head of the term always follows the dependent. The function c combines two terms using the next delimiter that does not occur in either of the two sub-terms. Here, if p is a leaf, return q(p). If p head is left, then p:left is assigned to the variable current_head and p:right is assigned to the variable current_dependent. Otherwise, p:right is assigned to the variable current_head and p:left is assigned to the variable current_dependent. Moreover, convert current_head and current_dependent by recursively calling this subroutine. Store the results in the variables converted_head and converted_dependent. Thereafter, return c(converted_head; converted_dependent; p). FIG. 33 shows pseudocode for these steps.

Figure 34:
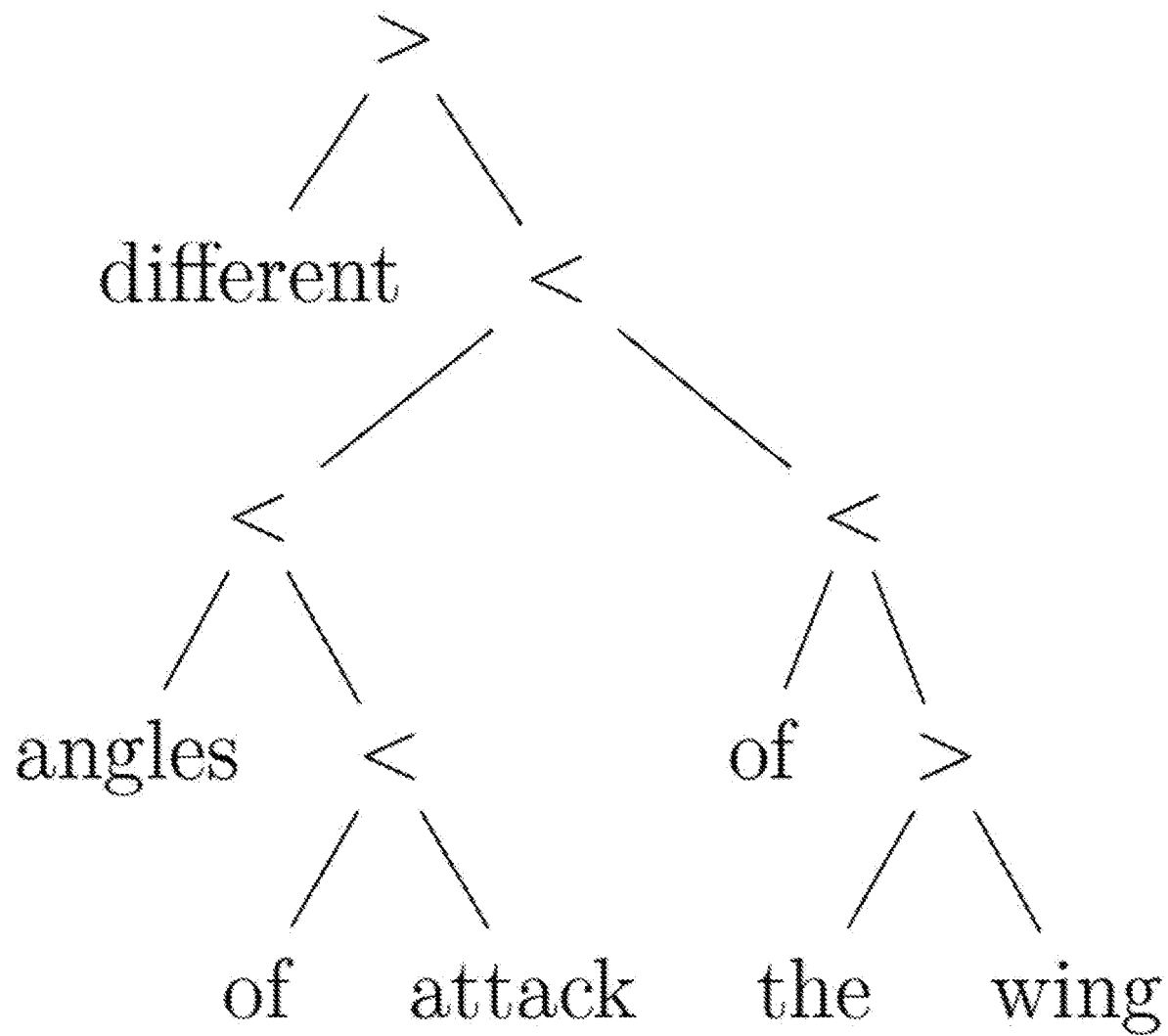
FIG. 34 shows a phrase structure tree.

With regard to the phrase represented by the bare phrase structure tree annotation shown in FIG. 34, the phrase is assigned to the variable p and passed to the conversion subroutine. In this case, p.head is right. As such, current_head will be set to the phrase "angles of attack of the wing" and current_dependent will be set to "different". Each of these daughters will be converted to a term. The phrase "different" is a leaf node, and so q("different") is returned as the term for this phrase. In the default system, the text will remain unchanged, as "different" is already a lemma. The phrase "angles of attack of the wing" is not a leaf node, so its daughters are converted. In this case, the daughters are "angles of attack" and "of the wing". These must be converted as well. The phrase "angles of attack" is not a leaf node. Its daughters are "angles" and "of attack". The daughter "angles" is a leaf node, and so it is converted to q("angles") which results in the term "angle", because "angle" is the lemma of "angles". The phrase "of attack" is a branching node, with daughters "of" and "attack". The phrase "of" is a stop word, and so the term returned is the empty string and ignored. This yields "attack", which is to be combined with "angle". Because "angle" is the head of the phrase, the resulting term is c("angle", "attack", "angle of attack"). In the default system, these terms are combined using the highest priority (lowest value) delimiter that does not appear in either term. In this case, it is ":0:", so the resulting term is "attack:0:angle". Thus, the phrase "of the wing" produces the term "wing", as both "of" and "wing" are stop words. The terms "wing" and "attack:0:angle" are then combine using c, again using the next-lowest delimiter, in this case producing "wing:1:attack:0:angle". Finally, "wing:1:attack:0:angle" and "different" are combined using c, producing "different:2:wing:1:attack:0:angle".

Association of all terms t in T' with document d is done by setting the value of t:document to a pointer to d. In pseudocode, this corresponds to lines 6 and 7 of the Main procedure. Though association can correspond to indexing in information-retrieval contexts. Since each term is indexed to the documents in which it is found, it is possible to search for documents by term or perform other information retrieval or information processing tasks. It is also possible to derive the set of terms that are found in a selected document, which is useful for other tasks such as topic modeling.

Figure 35:
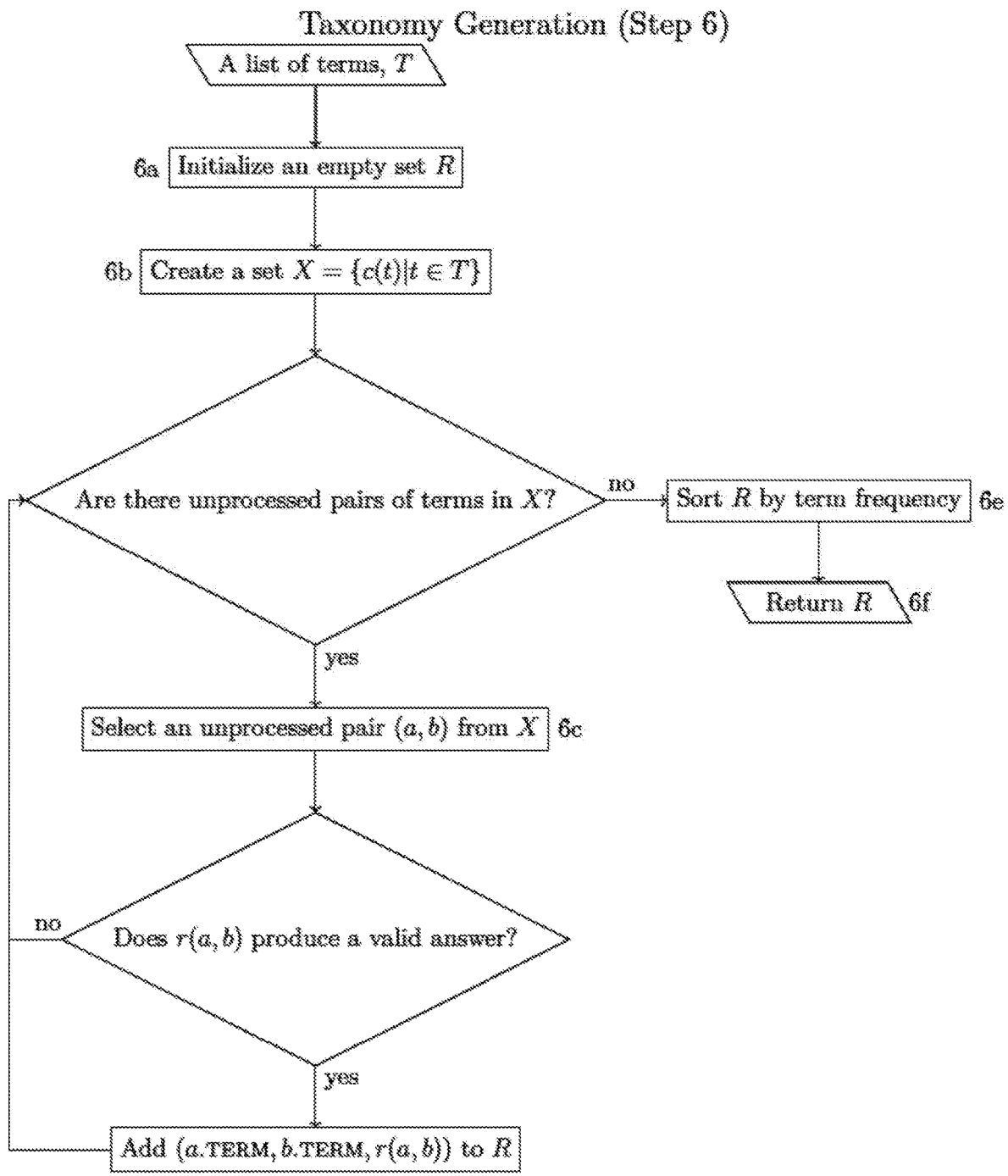
FIG. 35 shows taxonomy generation.

With regard to taxonomy generation and with reference to FIG. 35, the input to the taxonomy generation subroutine is a list of terms, T. The subroutine is also given a function c, which maps terms to some alternate taxonomic representation of type X as well as a function r which returns the relation that two alternate representations have. In the default system, the function c is simply the identity function; no changes are made to the terms in T in preparation for the taxonomy. In other cases, it may be useful to add or remove information from the terms, e.g., flattening the structures represented or inferring additional information.

The membership function r in the default system considers only one possible relationship type, which is left anonymous (i.e., the exact meaning of these relationships is not specified). These relations are identified in a simplistic way: if one term string-contains another, then the two are treated as related. This is simplistic; modifications can be made to capture notions such as hyponymy or hypernymy. Here, an empty set R is initialized. Every term t in T is converted into a taxonomic representation via c(t), creating a set X of elements of type X. An unprocessed pair of elements (a; b) in X is selected. If r(a; b) succeeds, add (a:term; b:term; r(a; b)) to R. R is sorted by the frequency of the component terms of each triple. It may be beneficial in downstream applications to include the most frequent relations or to exclude extremely frequent or infrequent relations. Thereafter, return R. FIG. 36 shows pseudocode for taxonomy generation.

The taxonomy generation process can also be used to renormalize terms in the ecology. Pairs of terms which are known to be related or which are identifiably related by one r but not by another can be renormalized by modifying the terms themselves, possibly based on other data such as parse trees.

The system terminates when the steps have been completed for every, a select set, or a select number of documents in the corpus. The returned values are the set of terms T, and the set of taxonomic relations R.

Embodiments of the subject matter and the operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more computers executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, workstations, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic; magneto-optical disks, optical disks, USB drives, and so on. However, a computer need not have such devices. Moreover, a computer can be embedded in another device, e.g., a mobile telephone, a personal digital assistant (PDA), a microwave oven, mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The central processing unit and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks). Such interconnects may involve electrical cabling, fiber optics, or be wireless connections.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A process for managing knowledge, the process comprising:
requesting a document by a knowledge manager;
communicating the documents to the knowledge manager from a knowledge database;
requesting a taxonomy by the knowledge manager;
communicating the taxonomy to the knowledge manager from a taxonomy manager;
requesting an ecosystem by the knowledge manager;
communicating the ecosystem to the knowledge manager from an ecosystem manager;
requesting an annotation by the knowledge manager;
communicating the annotation to the knowledge manager from an annotation manager with the annotation comprising an algebraic data type for a phrase such that the algebraic data type comprises a leaf that contains a string representing a lexical item; a left subtree; a right subtree; a head field that indicates whether the left subtree or right subtree contains a syntactic head of the phrase, and elements in the algebraic date type contain features that represent linguistic structure including syntactic category, dependency type, or a combination comprising at least one of the foregoing features; and
communicating a knowledge management data to a knowledge warehouse from the knowledge manager to manage knowledge,
wherein the knowledge management data comprises the documents, the taxonomy, the ecosystem, and the annotation.

2. The process of claim 1, further comprising:
requesting a taxonomy creation by the taxonomy manager;
communicating the taxonomy creation to the taxonomy manager from a taxonomy builder;
requesting a taxonomy scheme by the taxonomy builder;
communicating the taxonomy scheme to the taxonomy builder from a taxonomy framework;
requesting a taxonomy amendment by the taxonomy framework; and
communicating the taxonomy amendment to the taxonomy framework from a knowledge store.

3. The process of claim 1, further comprising:
requesting an ecosystem snippet by the ecosystem manager;
communicating the ecosystem snippet to the ecosystem manager from an ecosystem generator;
requesting an ecosystem scheme by the ecosystem generator;
communicating the ecosystem scheme to the ecosystem generator from an ecosystem framework;
requesting an ecosystem amendment by the ecosystem framework; and
communicating the ecosystem amendment to the ecosystem framework from a knowledge store.

4. The process of claim 1, further comprising:
requesting an annotation scheme by the annotation manager;
communicating the annotation scheme to the annotation manager from an annotation framework;
requesting an annotation amendment by the annotation framework; and
communicating the annotation amendment to the annotation framework from a knowledge store.

5. The process of claim 1, further comprising:
requesting a term snippet by the annotation manager;
communicating the term snippet to the annotation manager from a term generator;
requesting a term scheme by the term generator;
communicating the term scheme to the term generator from a term framework;
requesting a term amendment by the teen framework; and
communicating the term amendment to the term framework from a knowledge store.

6. The process of claim 1, further comprising:
requesting a phrase snippet by the annotation manager;
communicating the phrase snippet to the annotation manager from a phrase generator;
requesting a phrase generation scheme by the phrase generator;
communicating the phrase generation scheme to the phrase generator from a phrase generation framework;
requesting a phrase generation amendment by the phrase generation framework;
communicating the phrase generation amendment to the phrase generation framework from a knowledge store;
requesting a canonicalized phrase by the phrase generator;
communicating the canonicalized phrase to the phrase generator from a phrase canonicalizer;
requesting a phrase canonicalizing scheme by the phrase canonicalizer;
communicating the phrase canonicalizing scheme to the phrase canonicalizer from a canonicalization framework;
requesting a canonicalization amendment by the canonicalization framework; and
communicating the canonicalization amendment to the canonicalization framework from a knowledge store.

7. A computer-implemented method, comprising:
requesting a document by a knowledge manager;
communicating the documents to the knowledge manager from a knowledge database;
requesting a taxonomy by the knowledge manager;
communicating the taxonomy to the knowledge manager from a taxonomy manager;
requesting an ecosystem by the knowledge manager;
communicating the ecosystem to the knowledge manager from an ecosystem manager;
requesting an annotation by the knowledge manager;
communicating the annotation to the knowledge manager from an annotation manager with the annotation comprising an algebraic data type for a phrase such that the algebraic data type comprises a leaf that contains a string representing a lexical item: a left subtree; a right subtree; a head field that indicates whether the left subtree or right subtree contains a syntactic head of the phrase, and elements in the algebraic date type contain features that represent linguistic structure including syntactic category, dependency type, or a combination comprising at least one of the foregoing features; and
communicating a knowledge management data to a knowledge warehouse from the knowledge manager to manage knowledge,
wherein the knowledge management data comprises the documents, the taxonomy, the ecosystem, and the annotation.

8. The computer-implemented method of claim 7, further comprising:
   requesting a taxonomy creation by the taxonomy manager;
   communicating the taxonomy creation to the taxonomy manager from a taxonomy builder;
   requesting a taxonomy scheme by the taxonomy builder;
   communicating the taxonomy scheme to the taxonomy builder from a taxonomy framework;
   requesting a taxonomy amendment by the taxonomy framework; and
   communicating the taxonomy amendment to the taxonomy framework from a knowledge store.

9. The computer-implemented method of claim 8, further comprising:
   requesting an annotation scheme by the annotation manager;
   communicating the annotation scheme to the annotation manager from an annotation framework;
   requesting an annotation amendment by the annotation framework; and
   communicating the annotation amendment to the annotation framework from a knowledge store.

10. A system comprising:
    one or more computers configured to perform operations, the operations comprising:
    requesting a document by a knowledge manager;
    communicating the documents to the knowledge manager from a knowledge database;
    requesting a taxonomy by the knowledge manager;
    communicating the taxonomy to the knowledge manager from a taxonomy manager;
    requesting an ecosystem by the knowledge manager;
    communicating the ecosystem to the knowledge manager from an ecosystem manager;
    requesting an annotation by the knowledge manager;
    communicating the annotation to the knowledge manager from an annotation manager with the annotation comprising an algebraic data type for a phrase such that the algebraic data type comprises a leaf that contains a string representing a lexical item: a left subtree; a right subtree; a head field that indicates whether the left subtree or right subtree contains a syntactic head of the phrase, and elements in the algebraic date type contain features that represent linguistic structure including syntactic category, dependency type, or a combination comprising at least one of the foregoing features; and
    communicating a knowledge management data to a knowledge warehouse from the knowledge manager to manage knowledge,
    wherein the knowledge management data comprises the documents, the taxonomy, the ecosystem, and the annotation.

11. The system of claim 10, further comprising:
    requesting a taxonomy creation by the taxonomy manager;
    communicating the taxonomy creation to the taxonomy manager from a taxonomy builder;
    requesting a taxonomy scheme by the taxonomy builder;
    communicating the taxonomy scheme to the taxonomy builder from a taxonomy framework;
    requesting a taxonomy amendment by the taxonomy framework; and
    communicating the taxonomy amendment to the taxonomy framework from a knowledge store.

12. The system of claim 11, further comprising:
    requesting an annotation scheme by the annotation manager;
    communicating the annotation scheme to the annotation manager from an annotation framework;
    requesting an annotation amendment by the annotation framework; and
    communicating the annotation amendment to the annotation framework from a knowledge store.

13. A non-transitory computer-readable medium having instructions stored thereon, which, when executed by a processor, cause the processor to perform operations comprising:
    requesting a document by a knowledge manager;
    communicating the documents to the knowledge manager from a knowledge database;
    requesting a taxonomy by the knowledge manager;
    communicating the taxonomy to the knowledge manager from a taxonomy manager;
    requesting an ecosystem by the knowledge manager;
    communicating the ecosystem to the knowledge manager from an ecosystem manager;
    requesting an annotation by the knowledge manager;
    communicating the annotation to the knowledge manager from an annotation manager with the annotation comprising an algebraic data type for a phrase such that the algebraic data type comprises a leaf that contains a string representing a lexical item; a left subtree; a right subtree; a head field that indicates whether the left subtree or right subtree contains a syntactic head of the phrase, and elements in the algebraic date type contain features that represent linguistic structure including syntactic category, dependency type, or a combination comprising at least one of the foregoing features; and
    communicating a knowledge management data to a knowledge warehouse from the knowledge manager to manage knowledge,
    wherein the knowledge management data comprises the documents, the taxonomy, the ecosystem, and the annotation.

14. The non-transitory computer-readable medium of claim 13 in which the operations further comprise:
    requesting a taxonomy creation by the taxonomy manager;
    communicating the taxonomy creation to the taxonomy manager from a taxonomy builder;
    requesting a taxonomy scheme by the taxonomy builder;
    communicating the taxonomy scheme to the taxonomy builder from a taxonomy framework;
    requesting a taxonomy amendment by the taxonomy framework; and
    communicating the taxonomy amendment to the taxonomy framework from a knowledge store.

15. The non-transitory computer-readable medium of claim 14 in which the operations further comprise:
    requesting an annotation scheme by the annotation manager;
    communicating the annotation scheme to the annotation manager from an annotation framework;
    requesting an annotation amendment by the annotation framework; and
    communicating the annotation amendment to the annotation framework from a knowledge store.

* * * * *